(12) United States Patent
Hamilton et al.

(10) Patent No.: US 8,818,721 B2
(45) Date of Patent: Aug. 26, 2014

(54) METHOD AND SYSTEM FOR EXCHANGING DATA

(75) Inventors: Jeffrey A. Hamilton, Westminster, CO (US); Edward F. Jones, Palo Alto, CA (US); John F. Cameron, Los Altos, CA (US)

(73) Assignee: Trimble Navigation Limited, Sunnyvale, CA (US)

( * ) Notice: Subject to any disclaimer, the term of this patent is extended or adjusted under 35 U.S.C. 154(b) by 173 days.

(21) Appl. No.: 13/149,364

(22) Filed: May 31, 2011

(65) Prior Publication Data

US 2012/0310529 A1 Dec. 6, 2012

(51) Int. Cl.
*G01C 21/10* (2006.01)
*H04W 24/00* (2009.01)
*H04W 74/00* (2009.01)
*H04M 3/42* (2006.01)

(52) U.S. Cl.
USPC ...... 701/500; 455/456.1; 455/455; 455/414.2

(58) Field of Classification Search
USPC .......................................... 701/208; 455/457
See application file for complete search history.

(56) References Cited

U.S. PATENT DOCUMENTS

| | | | |
|---|---|---|---|
| 4,187,398 A * | 2/1980 | Stark | 455/456.1 |
| 5,841,026 A | 11/1998 | Kirk et al. | |
| 5,928,306 A | 7/1999 | France et al. | |
| 6,249,245 B1 | 6/2001 | Watters et al. | |
| 6,317,603 B1 | 11/2001 | Allison | |
| 6,324,473 B1 | 11/2001 | Eschenbach | |
| 6,370,475 B1 | 4/2002 | Breed et al. | |
| 6,397,147 B1 | 5/2002 | Whitehead | |
| 6,469,663 B1 | 10/2002 | Witehead et al. | |
| 6,473,032 B1 | 10/2002 | Trimble | |
| 6,529,830 B1 | 3/2003 | Eschenbach | |
| 6,567,041 B1 | 5/2003 | O'Dell | |
| 6,584,095 B1 | 6/2003 | Jacobi et al. | |
| 6,597,311 B2 | 7/2003 | Sheynblat et al. | |
| 6,677,894 B2 | 1/2004 | Sheynblat et al. | |
| 6,741,935 B1 | 5/2004 | Eschenbach | |
| 7,035,650 B1 * | 4/2006 | Moskowitz et al. | 455/456.5 |
| 7,050,815 B2 | 5/2006 | I'Anson et al. | |

(Continued)

FOREIGN PATENT DOCUMENTS

WO WO-01/50151 A1 7/2001

OTHER PUBLICATIONS

Hada, Hisakazu et al., "DGPS and RTK Positioning Using the Internet", *GPS Solutions*, Springer, Berlin. DE, vol. 4, No. 1. (Jul. 1, 2000),34-44.

(Continued)

*Primary Examiner* — Thomas Black
*Assistant Examiner* — Tyler Paige

(57) ABSTRACT

A system for exchanging data. A first mobile device configured to generate a first set of data related to a plurality of geographic positions where the first mobile device has been located and configured to exchange the first set of data with a second mobile device wherein the first mobile device receives a second set of data related to a plurality of geographic positions where the second mobile device has been located. A mapping system configured to receive the first set of data and the second set of data and to generate a map based on the first set of data and the second set of data.

54 Claims, 13 Drawing Sheets

(56) References Cited

U.S. PATENT DOCUMENTS

| | | | |
|---|---|---|---|
| 7,110,880 B2 | 9/2006 | Breed et al. | |
| 7,187,931 B2 | 3/2007 | Trossen | |
| 7,313,628 B2 | 12/2007 | Chaskar et al. | |
| 7,336,641 B2 | 2/2008 | Kim et al. | |
| 7,362,265 B2 | 4/2008 | Weill | |
| 7,474,896 B2 | 1/2009 | Mohi et al. | |
| 7,480,511 B2 | 1/2009 | O'Meagher | |
| 7,590,720 B2 * | 9/2009 | Bahl | 709/223 |
| 7,613,468 B2 | 11/2009 | Hamilton et al. | |
| 7,630,340 B2 | 12/2009 | Jung et al. | |
| 7,711,480 B2 | 5/2010 | Robbins | |
| 7,751,829 B2 | 7/2010 | Masuoka et al. | |
| 7,756,636 B2 * | 7/2010 | Kikuchi et al. | 701/420 |
| 7,911,379 B2 | 3/2011 | Cameron | |
| 7,957,748 B2 * | 6/2011 | Heater et al. | 455/456.1 |
| 7,961,717 B2 | 6/2011 | Lee et al. | |
| 8,014,945 B2 | 9/2011 | Cooper et al. | |
| 8,023,963 B2 | 9/2011 | Yonker et al. | |
| 8,032,300 B2 | 10/2011 | Nadkarni | |
| 8,073,461 B2 * | 12/2011 | Altman et al. | 455/456.1 |
| 8,085,195 B2 | 12/2011 | Abraham | |
| 8,103,430 B2 | 1/2012 | Aliakbarzadeh | |
| 8,103,438 B2 | 1/2012 | Petrie et al. | |
| 8,311,526 B2 | 11/2012 | Forstall et al. | |
| 8,369,867 B2 * | 2/2013 | Van Os et al. | 455/456.1 |
| 8,437,693 B2 | 5/2013 | Brown et al. | |
| 2003/0025632 A1 | 2/2003 | Sheynblat et al. | |
| 2003/0055666 A1 | 3/2003 | Roddy et al. | |
| 2003/0195008 A1 | 10/2003 | Mohi et al. | |
| 2004/0006424 A1 | 1/2004 | Joyce et al. | |
| 2004/0096041 A1 | 5/2004 | Beckmann et al. | |
| 2004/0151152 A1 | 8/2004 | Kim et al. | |
| 2004/0166861 A1 | 8/2004 | Trossen | |
| 2005/0010361 A1 | 1/2005 | Runkel et al. | |
| 2005/0064878 A1 | 3/2005 | O'Meagher | |
| 2005/0136845 A1 * | 6/2005 | Masuoka et al. | 455/67.14 |
| 2005/0137786 A1 | 6/2005 | Breed et al. | |
| 2006/0029020 A1 | 2/2006 | Jung et al. | |
| 2006/0064244 A1 | 3/2006 | Robbins | |
| 2006/0149466 A1 | 7/2006 | Kikuchi et al. | |
| 2006/0227047 A1 * | 10/2006 | Rosenberg | 342/357.13 |
| 2006/0271290 A1 * | 11/2006 | Li | 701/213 |
| 2007/0005244 A1 | 1/2007 | Nadkarni | |
| 2007/0030841 A1 | 2/2007 | Lee et al. | |
| 2007/0060097 A1 | 3/2007 | Edge et al. | |
| 2007/0066322 A1 | 3/2007 | Bahl | |
| 2007/0200755 A1 | 8/2007 | Hamilton et al. | |
| 2008/0132251 A1 | 6/2008 | Altman et al. | |
| 2008/0248813 A1 * | 10/2008 | Chatterjee | 455/456.2 |
| 2008/0268870 A1 * | 10/2008 | Houri | 455/456.1 |
| 2008/0309550 A1 | 12/2008 | Sairo et al. | |
| 2009/0005021 A1 * | 1/2009 | Forstall et al. | 455/414.3 |
| 2009/0082949 A1 | 3/2009 | Petrie et al. | |
| 2009/0104919 A1 * | 4/2009 | Heater et al. | 455/456.1 |
| 2009/0143079 A1 * | 6/2009 | Klassen et al. | 455/456.3 |
| 2009/0186628 A1 | 7/2009 | Yonker et al. | |
| 2009/0197617 A1 * | 8/2009 | Jayanthi | 455/456.2 |
| 2009/0262974 A1 * | 10/2009 | Lithopoulos | 382/100 |
| 2009/0325603 A1 * | 12/2009 | Van Os et al. | 455/456.2 |
| 2010/0029302 A1 * | 2/2010 | Lee et al. | 455/456.6 |
| 2010/0069035 A1 * | 3/2010 | Johnson | 455/404.1 |
| 2010/0075643 A1 * | 3/2010 | Cooper et al. | 455/414.1 |
| 2010/0182196 A1 | 7/2010 | Abraham | |
| 2010/0205242 A1 * | 8/2010 | Marchioro et al. | 709/203 |
| 2010/0216491 A1 * | 8/2010 | Winkler et al. | 455/457 |
| 2010/0273459 A1 * | 10/2010 | Stern et al. | 455/414.1 |
| 2011/0183606 A1 | 7/2011 | Brown et al. | |

OTHER PUBLICATIONS

Landau, Herbert et al., "Virtual Reference Station Systems", *Journal of Global Positioning Systems, International Association of Chinese Professionals in Global Positioning Systems*, Sydney; AU, vol. 1, No. 2, (2002), 137-143.

Intuicom Inc., "RTK Bridge-E", http://www.intuicom.com/www/datasheets/RTKBridgeE.pdf, (Dec. 2009), 2 pages.

Intuicom Inc., "Intuicom RTK Bridge Press Release", www.intuicom.com/www/RTK/rtkBridge.htm, 1 page.

Intuicom, "RTK Bridge-C", www.intuicom.com/www/datasheets/RTKBridgeC_Dec2009.pdf, (Dec. 2009), 2 pages.

\* cited by examiner

Process
200

A FIRST SET OF DATA IS GENERATED AT A FIRST MOBILE DEVICE WHEREIN THE FIRST SET OF DATA IS RELATED TO A PLURALITY OF GEOGRAPHIC POSITIONS WHERE THE FIRST MOBILE DEVICE HAS BEEN LOCATED
202

A SECOND SET OF DATA IS WIRELESSLY RECEIVED AT THE FIRST MOBILE DEVICE WHEREIN THE SECOND SET OF DATA IS RELATED TO A PLURALITY OF GEOGRAPHIC POSITIONS WHERE THE SECOND MOBILE DEVICE HAS BEEN LOCATED
204

THE FIRST SET OF DATA AND THE SECOND SET OF DATA IS WIRELESSLY TRANSMITTED FROM THE FIRST MOBILE DEVICE TO A MAPPING SYSTEM SUCH THAT THE FIRST SET OF DATA AND THE SECOND SET OF DATA IS USED TO CREATE A MAP
206

FIG. 2

PROCESS
300

A FIRST SET OF DATA AND A SECOND SET OF DATA IS RECEIVED FROM A FIRST MOBILE DEVICE AT A MAPPING SYSTEM WHEREIN THE FIRST SET OF DATA COMPRISES DATA RELATED TO GEOGRAPHICAL POSITIONS OF THE FIRST MOBILE DEVICE AND THE SECOND SET OF DATA COMPRISES DATA RELATED TO GEOGRAPHICAL POSITIONS OF A SECOND MOBILE DEVICE
302

A MAP IS GENERATED AT THE MAPPING SYSTEM BASED ON THE FIRST SET OF DATA AND THE SECOND SET OF DATA
304

MOVEMENTS OF PEOPLE ARE INFERRED BASED ON THE FIRST SET OF DATA AND THE SECOND SET OF DATA
306

CHARACTERISTICS OF A BUILDING ARE INFERRED BASED ON A MEASUREMENT OF A SIGNAL STRENGTH OF THE RECEIVING THE FIRST SET OF DATA AND THE SECOND SET OF DATA FROM THE FIRST MOBILE DEVICE
308

FIG. 3

METHOD AND SYSTEM FOR EXCHANGING DATA

TECHNICAL FIELD

Embodiments of the present technology relate to exchanging data. More specifically, embodiments of the present technology relate to exchanging data between mobile devices wherein the data is used to generate a map.

BACKGROUND ART

Modern devices are becoming increasing mobile and have an increasing amount of capabilities such as the ability to network to other devices. Mobile devices are continuously carried by people into many locations and places. Such mobile devices may collect data as they are carried from place to place and the data may be regarding the geographical position or location of the mobile device and may also collect data regarding environmental conditions. Such data may be sent to other devices. Such data may be useful in unexpected ways.

BRIEF DESCRIPTION OF THE DRAWINGS

The accompanying drawings, which are incorporated in and form a part of this specification, illustrate embodiments of the present technology and, together with the description, serve to explain the principles of the present technology. The drawings referred to in this description should not be understood as being drawn to scale except if specifically noted.

FIG. 2 is a flowchart of a method for exchanging data, according to another embodiment of the present technology.

FIG. 3 is a flowchart of a method for exchanging data, according to one embodiment of the present technology.

DESCRIPTIONS OF EMBODIMENTS

Figure 1:
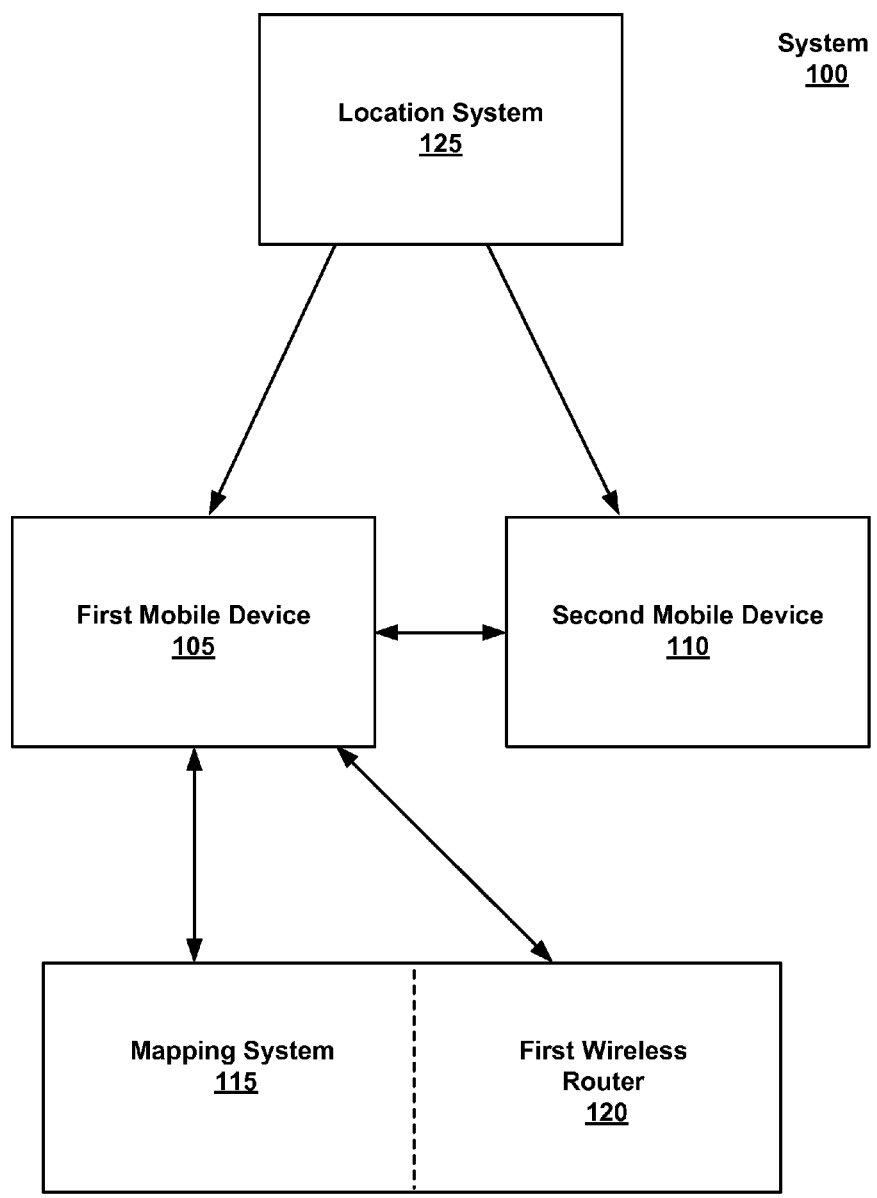
FIG. 1 is a block diagram of a system for exchanging data, according to one embodiment of the present technology.

Reference will now be made in detail to various embodiments of the present technology, examples of which are illustrated in the accompanying drawings. While the present technology will be described in conjunction with these embodiments, it will be understood that they are not intended to limit the present technology to these embodiments. On the contrary, the present technology is intended to cover alternatives, modifications and equivalents, which may be included within the spirit and scope of the present technology as defined by the appended claims. Furthermore, in the following description of the present technology, numerous specific details are set forth in order to provide a thorough understanding of the present technology. In other instances, well-known methods, procedures, components, and circuits have not been described in detail as not to unnecessarily obscure aspects of the present technology.

Unless specifically stated otherwise as apparent from the following discussions, it is appreciated that throughout the present description of embodiments, discussions utilizing terms such as "receiving", "storing", "generating", "transmitting", "inferring," or the like, refer to the actions and processes of a computer system, or similar electronic computing device. The computer system or similar electronic computing device manipulates and transforms data represented as physical (electronic) quantities within the computer system's registers and memories into other data similarly represented as physical quantities within the computer system memories or registers or other such information storage, transmission, or display devices. Embodiments of the present technology are also well suited to the use of other computer systems such as, for example, mobile communication devices.

Overview

Mobile devices are employed by people to accomplish a variety of tasks. Mobile devices are designed with an increasing number of features including the ability to generate and collect different types of data as well as the ability to transmit data using multiple techniques. Many mobile devices are position centric and have the ability to generate and store data related to the geographical position of the device as it moves through space and time. Mobile devices are able to exchange this information with each other as well as other electronic devices using various networking techniques. People carry their mobile devices with them and thus the mobile devices are also collecting data regarding the geographical position or location of people as they move through space and time.

As people move near one another, their devices also move near one another. Using networking techniques, the mobile devices may exchange data with each other. This data may also be transmitted to other electronic devices that have a fixed geographical position. This exchange of data creates large enough data stores for devices to make inferences based upon the data. For example, geographical position data may be used to generate maps of indoor and outdoor spaces. Inferences regarding the movements of people or other objects may also be made such as identifying high traffic areas within a building. Other data may also be collected and analyzed such as environmental data or signal strength data. The exchange of data may include both geographical data as well as environmental data thus allowing an ad-hoc network to enable reality searches. The inferences and maps generated may be employed by a wide variety of users including users of mobile devices, emergency responders, city planners, etc. The inferences and maps generated may be obtained using a variety of devices or methods including alerts that may be sent to users. Thus large amounts of data may be collected using a plurality of devices without requiring one entity to purchase and maintain all of the devices.

Embodiments of the present technology also employ the signal strength of transceivers to make determinations and inferences. For example, a network of mobile transceivers may communicate with each other and a control station using wireless transmissions. The transceivers and control station may measure the signal strength of the transmissions and report the measurements to the control station. The control station may then use the signal strength measurements to make determination regarding the location and pathways traveled by a particular mobile transceiver. These pathways and locations are then used to make inferences and generate a map.

Exchanging Data in Accordance with Embodiments of the Present Technology

FIG. 1 is a block diagram of an exemplary system 100 for exchanging data, according to embodiments of the present technology. It is noted that the blocks in FIG. 1 can be arranged differently than as illustrated, and can implement additional or fewer features than what are described herein. Further, the features represented by the blocks in FIG. 1 can be combined in various ways.

As depicted in FIG. 1, the system 100 includes first mobile device 105, second mobile device 110, mapping system 115, first wireless router 120 and location system 125. It should be appreciated that first mobile device 105 and second mobile device 110 may be the same type of devices or may be different. Second mobile device 110 may have any or all of the abilities of first mobile device 105 described herein. Additionally, system 100 may include a plurality of mobile devices beyond first mobile device 105 and second mobile device 110.

In one embodiment, first mobile device 105 is a smart phone that is mobile and position aware. In one embodiment, first mobile device 105 is able to store data, at least temporarily, related to the geographical positions in which first mobile device 105 has been located and first mobile device 105 is able to transmit this data to another device. It should be appreciated that first mobile device 105 or second mobile device 110 may be but are not limited to smart phones, computer systems, personal digital assistants, laptops, netbooks, handheld electronic devices, routers, etc. In one embodiment, first mobile device 105 is able to generate and store data related to the environmental conditions around first mobile device 105.

In one embodiment, first mobile device 105 and second mobile device 110 are position centric devices that are able to generate and store data related to the geographical position of the device as it moves through space and time. In one embodiment, first mobile device 105 may store position centric data for a temporary amount of time.

For the purposes of the present technology, the term "geographic position" means the determining in at least two dimensions (e.g., latitude and longitude), the location the device. In one embodiment, the device determines its position using signals received from location system 125. In one embodiment, location system 125 is a satellite based position determining system and receives navigation data from satellites via an antenna (not shown). Examples of satellite based position determining systems include the global positioning system (GPS) navigation system, a differential GPS system, a real-time kinematics (RTK) system, a networked RTK system, etc. While the present embodiment recites these position determining systems specifically, it is appreciated that embodiments of the present technology are well suited for using other position determining systems as well such as ground-based position determining systems, or other satellite-based position determining systems such as the Global Navigation Satellite System (GNSS), the Global Orbiting Navigation Satellite System (GLONASS), Compass/Beidu, or the Galileo system currently under development. In one embodiment, the mobile employs signals from radio towers such as cell phone towers to determine its locations. For example, location system 125 may be a set of three cell phone towers that are used by the mobile device to triangulate its location.

Geographical position or location may also include information regarding elevation in addition to latitude and longitude. In one embodiment, geographic position data is generated by techniques using a wireless network with two or more receivers on each floor of a building.

In one embodiment, first mobile device 105 is able to exchange or transmit and receive data. For example, first mobile device 105 may be able to network with another device such as second mobile device 110, mapping system 115 or first wireless router 120. Such networking may be accomplished using a variety of means such as radio communications, wireless communication, Bluetooth, Wi-Fi, cellular, Internet, etc. Such networking may be typically used for either short range or long range communications.

In one embodiment, first mobile device 105 and second mobile device 110 exchanging data with each other. Such data may be a recent history of the geographical locations the mobile device has been located, other position information, environmental condition data, or other data. In one embodiment, mobile devices exchange both geographical position data as well as environmental data. Both sets of data are then made available to a user to perform a reality search. A reality search is defined as a search where the user is able to gain data about the reality of an environment at a given geographical location.

In one embodiment, this exchange of data takes place automatically without requiring any input or command from a user. In one embodiment, this exchange of data occurs when first mobile device 105 and second mobile device 110 are physically proximate to each other. Such physical proximity may be determined based on any number of factors or a combination of factors. In one embodiment, physical proximity may be determined based by the physical distance first mobile device 105 and second mobile device 110 are separated from each other. For example, the two devices may exchange data when they are five meters or apart or closer. Such a range of distance could be set to any desired distances. First mobile device 105 and second mobile device 110 may be aware that they are in physical proximity to one another using position aware data collected by the mobile device. In one embodiment, the first mobile device 105 and second mobile device 110 experience an initial contact or communication with one another before determining to automatically exchange data. This initial contact may be known in the art as a handshake. In one embodiment, the mobile devices communication with a presence absence device such as a radio frequency identification (RFID) tag, an RFID tag with Ruby, and/or a Wi-Fi tag.

In one embodiment, the physical proximity of first mobile device 105 and second mobile device 110 is determined if the two mobile devices are within a communication range of each other. For example, if the exchange is to take place over a short range radio protocol, such as Bluetooth, then the two devices are determined to be physically proximate to each other if they are within an effective range for the short range radio protocol. In one embodiment, a programmed protocol determines physical proximity of first mobile device 105 and second mobile device 110.

In one embodiment, the exchange of data is one-way. For example, second mobile device 110 may transmit data to first mobile device 105 without first mobile device 105 transmitting data to second mobile device 110. A one-way exchange of data may take place if either mobile device is incapable of transmitting data or of collecting and/or generating the data. In one embodiment, the exchange of data is two-way where both first mobile device 105 and second mobile device 110 are transmitting and receiving data. In one embodiment, the exchange of data is many-to-many where a plurality of more than two devices all exchange data with each other. Thus the present technology may encompass one-to-one, one-to-many and many-to-many data exchanges.

In one embodiment, when first mobile device 105 and second mobile device 110 encounter one another, they may form a temporary network known as either a micro-net, pico-net, personal area network, etc. Such a pico-net may be established for only a short time period such as the duration of time required to complete the described data exchange. In one embodiment, over a time period, first mobile device 105 may encounter many other devices and create a pico-net with each device it comes into contact with. Thus several pico-nets may be created and terminated in an ad hoc fashion. It should be appreciated that these temporary small networks may be scalable. For example, first mobile device 105 and second mobile device 110 may encounter one another and create a temporary pico-net, during a data exchange between the two devices, a third device may be encountered such as another mobile device or a device such as mapping system 115. At this point the network may be expanded to include the third device. The network may be expanded to include any number of devices and thus the network may go from a pico-net to a macro-net. Similarly, a large network may be reduced to smaller network.

In one embodiment, first mobile device 105 transmits data to mapping system 115. It should be appreciated that mapping system 115 is a computer system that may be mobile or fixed and is capable of analyzing data and making inferences based on the analyzed data. In one embodiment, first mobile device 105 transmits a data set to mapping system 115 related to geographical positions of where first mobile device 105 has been located. In one embodiment, first mobile device 105 transmits a data set to mapping system 115 related to geographical positions of where second mobile device 110 has been located. First mobile device 105 may transmit several data sets to mapping system 115 where each data set is related to a different device. For example, first mobile device 105 may encounter and exchange data with four mobile devices during a given time period. Later, first mobile device 105 may encounter mapping system 115 and transmit data sets from all four mobile devices and a data set from first mobile device 105. Thus mapping system 115 may have five distinct data sets from five different mobile devices but is only required to receive data from first mobile device 105. In one embodiment, mapping system 115 receive data related to environmental conditions from first mobile device 105.

In one embodiment, second mobile device 110 exchanges data with a third mobile device and then later transmits data generated by second mobile device 110 and the data received from the third device to first mobile device 105. Thus first mobile device 105 may receive more than one set of data related to distinct mobile devices by exchanging data with second mobile device 110. First mobile device 105 may then transmit three data sets to mapping system 115.

In one embodiment, first mobile device 105 may not transmit data directly to mapping system 115 but instead transmits the data to first wireless router 120. First wireless router 120 may be a traditional wireless router using a variety of protocols that are well known in the art for wireless networking including cellular, wife, Bluetooth, RFID, radio, etc. First wireless router 120 may be a fixed router that does not change its geographical position. First wireless router 120 may be networked to mapping system 115 using a variety of traditional networking techniques. In one embodiment, first wireless router 120 communicates with mapping system 115 over the Internet. In one embodiment, first wireless router 120 is coupled with mapping system 115 as is shown by the dotted line in FIG. 1. It should be appreciated that first wireless router 120 and mapping system 115 may be one device, different components of the same device, or different devices. In one embodiment, mapping system 115 is a fixed device that does not change geographical positions.

Mapping

In one embodiment, mapping system 115 analyzes the data received from first mobile device 105 and any other mobile device that mapping system 115 received data from. Mapping system 115 may then make inferences based on the data. For example, data sets related to geographical positions may be used by mapping system 115 to infer and generate a map. Such a map may be of an outdoor region or an interior map of a building. People typically carry mobile devices with them on their person and thus mapping system 115 may also be able to make determinations regarding the behavior of people in a given space. Determinations may also be made regarding the purpose of a given space.

In one embodiment, an interior map of a building is generated including a map of a building with multiple stories or floors. Mapping system 115 may then make inferences regarding human behavior within the building. For example, mapping system 115 may determine high traffic areas where people often move from one place to another within the building. Mapping system 115 may also determine rooms or spaces that are likely or unlikely to be occupied by people. Such information may be employed by emergency responders in an emergency or disaster. Emergency responders would be able to use the map of the building generated by mapping system 115 to navigate the building as well as make decisions regarding where to look for survivors or other people that may be in need of assistance. Additionally the map and other inferences may be employed by users of mobile devices. Users may also employ a map to navigate the interior of the building. For example, the building may be a train station and a user may employ the inferences of mapping system 115 to avoid high traffic areas or to avoid time periods of high traffic. Traditionally, creating such an interior map of many buildings including information regarding movements within a building would be quite expensive for one entity to accomplish. The present technology allows for the use of crowd sourcing techniques to automatically gather large amounts of data that can be analyzed in useful ways with little expense to any one entity. In one embodiment, the user may obtain the information generated by mapping system 115 over a mobile device or over some other communication platform including a computer system connected to the Internet.

In one embodiment, mapping system 115 may collect data related to the signal strength of a device transmitting to mapping system 115 relative to the device's geographic location. This signal strength data may be analyzed to make inferences about a building. For example, an inference could be made regarding the type of material employed in the construction of the building.

In one embodiment, the present technology may be used to create a map of an interior space as it is actually constructed. A building may be constructed differently from plans or blueprints that may be on file with a government entity. For example, an emergency responder may have a blueprint of a building that is not accurate because changes were made as the building was constructed or the building may have been remodeled after the first responder received the blueprints. Some building also employ temporary walls such as those used to construct cubicles. The present technology is able to generate a map of a collection of cubicles. Such an example may lead to delays in an emergency when time is critical. The present technology is able to solve this dilemma by creating an interior map of a building that represents the building as it is constructed. The map may include locations of walls, doors, windows, lobbies, rooms, closets, bathrooms, etc. and is also able identify areas on the map that are high traffic areas. Such a map is also able to map multiple floors of a building. Additionally, maps created by the present technology may be electronically available and thus are more readily accessible in an emergency to a first responder as opposed to a paper map.

In one embodiment, a map is generated by collecting data as described above and then making inferences about the movement of people in an interior space. Such an inference may be whether a person is sitting, moving in a hallway, moving through a door way. In one embodiment, such inferences may require a comparison of data from a plurality of mobile devices. For example, several sets of data from several mobile devices may indicate that there is a door in a given location because all foot traffic enters into a room at the same geographical position. In addition to a map, in one embodiment, the present technology may generate a report indicating how much time a given person spends in a given geographical location. Such a report may be used to may inference about the type of space the geographical location is or what it is used for. Such information may be anonymous and not identify the person being tracked. In one embodiment, maps, inferences and reports generated by the present technology may be updated in real time. In one embodiment, real time updates are automatically updated to an electronic map in use by an end user.

In one embodiment, mapping system 115 is able to generate a map of an outdoor space where the map is based on data collected from mobile devices. An outdoor map may include locations of streets, buildings, houses, steps, curbs, natural terrain changes or anomalies, changes in elevation, etc. For example, a map may be generated of an outdoor shopping mall. In one embodiment, a map is generated that includes both indoor and outdoor features. In one embodiment, a street is identified as street by collecting data from mobile devices and identifying locations where uses change elevation stepping up or down a curb. Thus a street may be differentiated from a sidewalk on a map created by the present technology.

Figure 7:
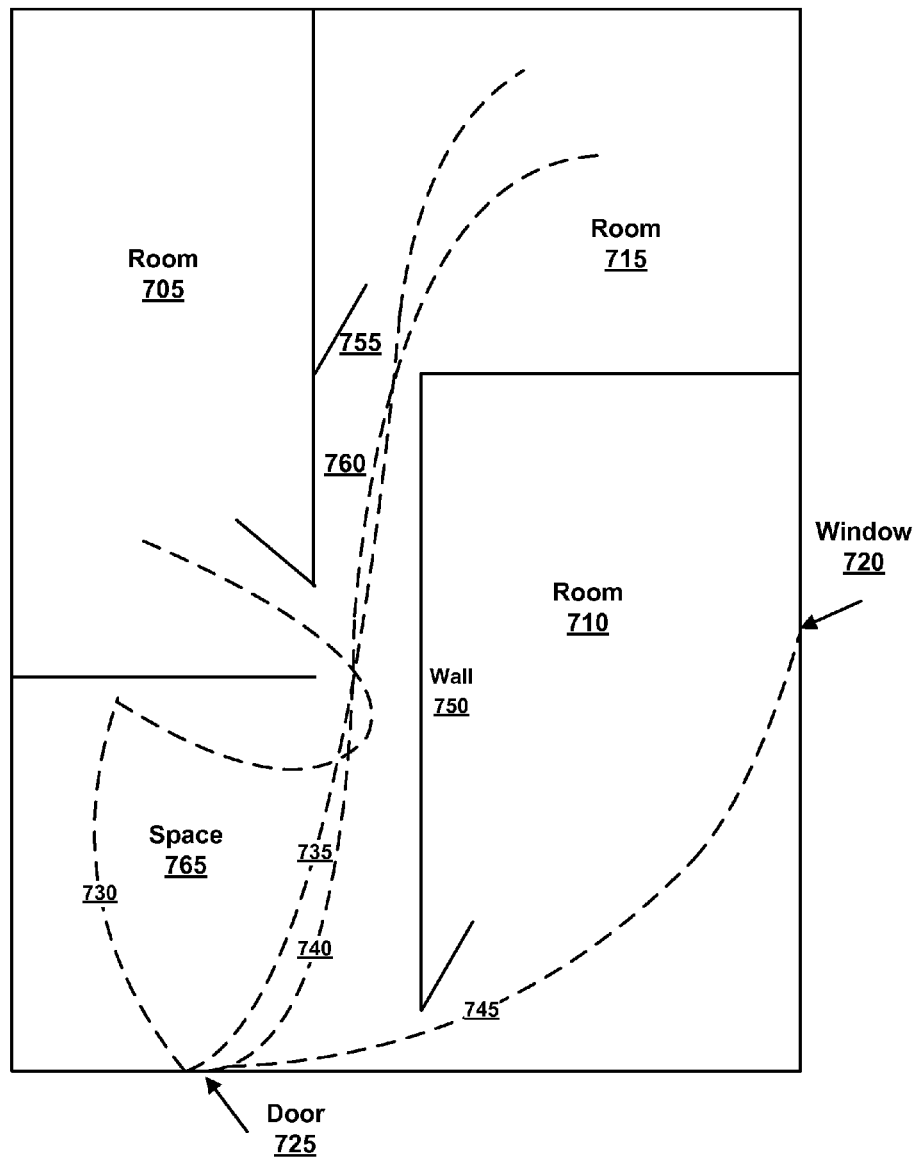
FIG. 7 is a block diagram of a map, according to one embodiment of the present technology.

FIG. 7 is a block diagram of map 100, in accordance with embodiments of the present technology. It is noted that the blocks in FIG. 7 can be arranged differently than as illustrated, and can implement additional or fewer features than what are described herein. Further, the features represented by the blocks in FIG. 7 can be combined in various ways.

In one embodiment, map 700 includes paths 730, 735, 740 and 745. In one embodiment, paths 730, 735, 740 and 745 represent a geographical path that taken by a mobile device over a period of time. For example, path 730 may be the path taken by first mobile device 105 of FIG. 1. In one embodiment, a user may be carrying the mobile device; however a user is not required to carry the mobile device for some embodiments of the present technology. In one embodiment, paths 730, 735, 740 and 745 represent footpaths taken by a user either outdoors or in a building. Map 700 shows how the footpaths may be used make inferences regarding the structures of a building or other space. In one embodiment, paths 735 and 740 are similar to each other. Data taken regarding paths 735 and 740 may be compared to one another as well as additional other similar paths to infer that 760 is a hallway in a building and 750 is a wall adjacent to hall 760. Additionally, it may be inferred that paths 735 and 740 lead through door 755 into room 715 that has no other exits. Thus it can be seen that when similar paths are analyzed together inferences may be made that can lead to the creation of a map.

In one embodiment, the present technology uses paths 730, 735, 740 and 745 to infer that map 700 should include rooms 705, 710, and 715, window 720, doors 725 and 755, hall 760 and space 765. For example, it can be seen that paths 730, 735, 740 and 745 all either begin or end at door 725 and it may be inferred that door 725 is an exterior door. In one embodiment, paths 730, 735, 740 and 745 include time stamps such that the speed that the mobile device travels along a path may be inferred. Also the length of time a mobile device remains stationary in a given place may lead to inferences about the space. For example, in one embodiment, path 730 abruptly changes positions but the mobile device remains at the abrupt change in position for a length of time with is also accompanied by a small change in elevation before and after the mobile device remains in position. Therefore it may be inferred that a user sat, thus changing elevations, on a piece of furniture for a period of time and then stood up and moved to another position.

Signal Strength

Figure 6:
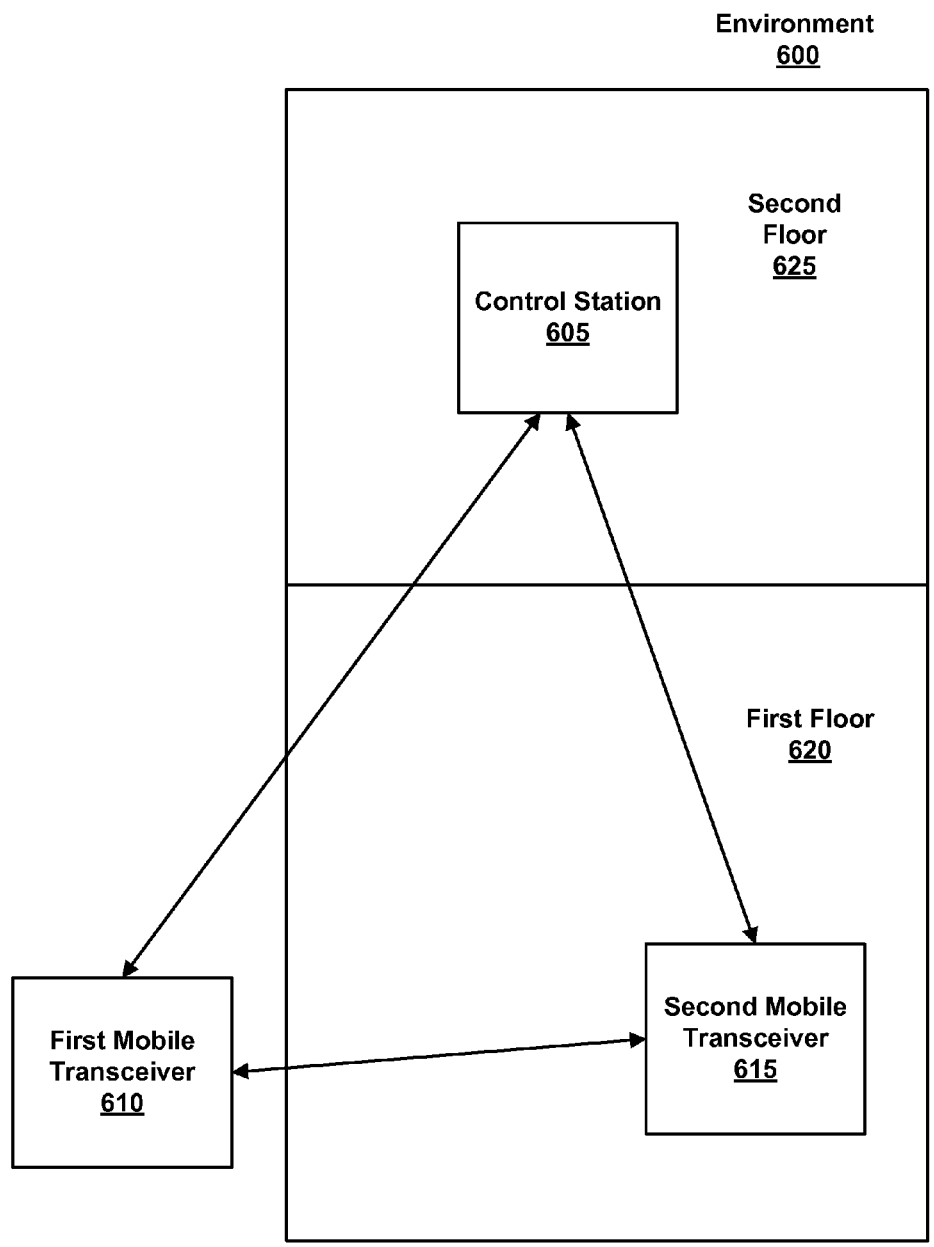
FIG. 6 is a block diagram of an environment for exchanging data, according to one embodiment of the present technology.

FIG. 6 is a block diagram of environment 600, in accordance with embodiments of the present technology. It is noted that the blocks in FIG. 6 can be arranged differently than as illustrated, and can implement additional or fewer features than what are described herein. Further, the features represented by the blocks in FIG. 6 can be combined in various ways. In one embodiment, environment 600 includes control station 605, first mobile transceiver 610, second mobile transceiver 615, first floor 620 and second floor 620.

In one embodiment, control station 605, first mobile transceiver 610 and second mobile transceiver 615 are capable of acting as a transceiver to transmit and receive signals to and from other transmitters, receivers and transceivers. In one embodiment, such transmissions may be radio frequencies. Such transmissions may follow well established protocols such as cellular, Bluetooth, Wi-Fi, Zigbee, shortwave radio, etc.

It should be appreciated that first mobile transceiver 610, second mobile transceiver 615 and other transceivers of the present technology may be, but are not limited to, cell phones, smart phones, handheld devices, computers systems, radios, etc. In one embodiment, the transceivers of the present technology are capable of transmitting more than one type of signal of using more than one type of protocol. The present technology may employ more than one type of signal to accomplish its purposes. For example, control station 605 may employ both cellular signals and Wi-Fi signals to complete its purposes. In one embodiment, the content of such signals is not decoded or decrypted but is only measured for its signal strength.

Figure 4:
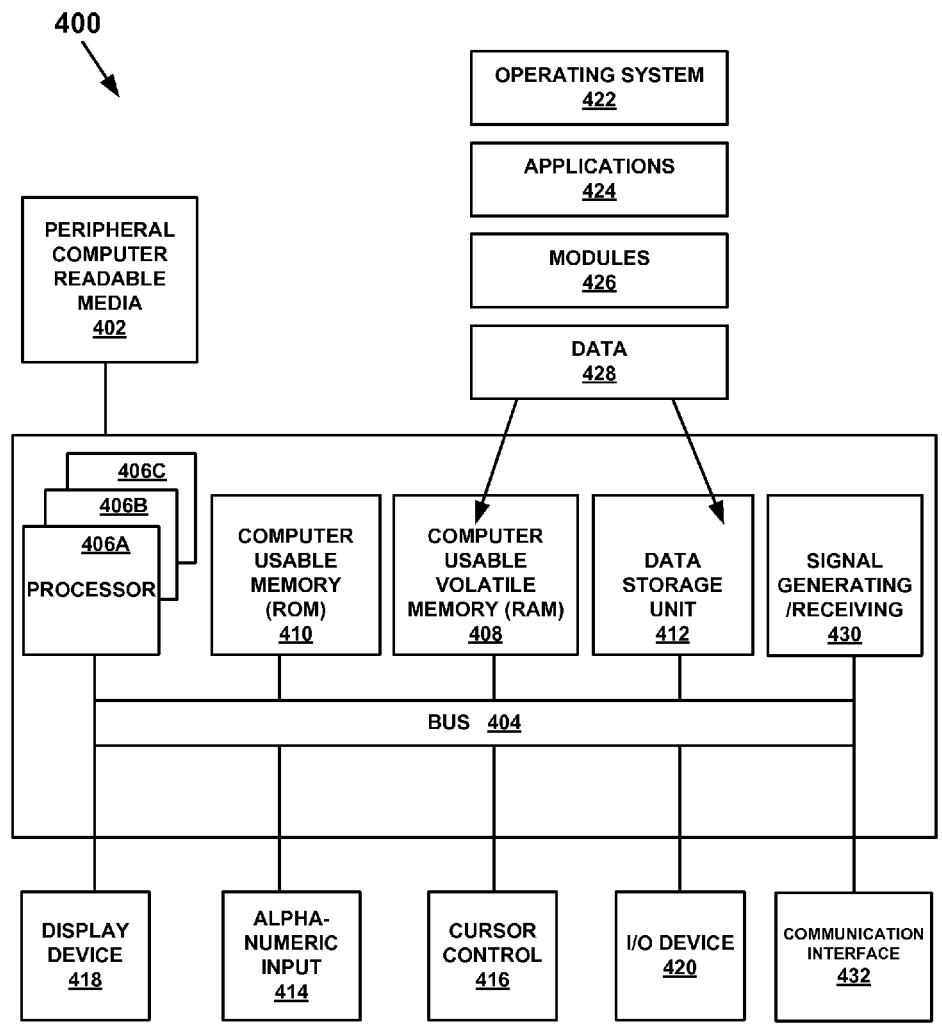
FIG. 4 illustrates a diagram of an example computer system upon which embodiments of the present technology may be implemented.

In one embodiment, control station 605 is a hardware device and may be coupled with a computer system that has features and components such as those described in FIG. 4. In one embodiment, control station 605 is capable of communicating with a plurality of transceivers during that same time period. In one embodiment, control station 605 forms a data network with first mobile transceiver 610 and second mobile transceiver 615 that may include other transceivers or other computer devices. In one embodiment, control station 605 is connected to a second network that first mobile transceiver 610 and second mobile transceiver 615 may or may not be connected to such as the Internet, a Local Area Network, a cellular network, etc.

In one embodiment, control station 605 receives a first transmission from first mobile transceiver 610. Control station 605 may then measure signal strength of the first transmission to make a determination regarding the geographical location of first mobile transceiver 610. In one embodiment, control station 605 has data regarding an initial geographic position of first mobile transceiver 610 and a measure of the signal strength of a transmission from first mobile transceiver 610 at the initial geographic position. This change is signal strength may be used to determine the currently location of first mobile transceiver 610. In one embodiment, first mobile transceiver 610 transmits a first transmission to several other transceivers. Each transceiver then measures the signal strength of the first transmission and sends that signal strength data to control station 605. Control station 605 is able to analyze all of the signal strength data related to the first transmission of first mobile transceiver 610 to determine the position of first mobile transceiver 610.

In one embodiment, this process is carried out repeatedly for multiple transmissions being sent from first mobile transceiver 610. Control station 605 may then generate a path that first mobile transceiver 610 has traveled based on the signal strength of the transmissions sent to control station 605 and other transceivers. The path of first mobile transceiver 610 may be employed by control station 605 to generate a map. In one embodiment, such a map is generated based upon inferences made regarding the path of first mobile transceiver 610. For example, over a period of time control station 605 may record geographic positions that first mobile transceiver 610 travels to, does not travel to, regularly travels to, seldom travels to, etc. This data may be used to infer features of an indoor building or an outdoor space. In one embodiment, environment 600 is employed to generate map 700 of FIG. 7. In one embodiment, the signal strength data may be used to infer placement of windows, walls, doors, etc.

In one embodiment, control station 605 does not generate the map but forwards the data required to generate a map to another computer device. Such forwarding could take place over a wired or wireless network. In one embodiment, environment 600 has more than one control station. In one embodiment, the signal strength from first mobile transceiver 610 is degraded as it passes through objects. This degrading of the signal strength allows control station 605 to make determinations regarding what type of object the transmission is passing through. Examples of such objects may be man made such as doors, windows, steel, exterior and interior walls, glass, etc. or natural such as trees, hills, rocks, dirt, vegetation, etc.

In one embodiment, an area is illuminated with radio frequency (RF) energy from a plurality of RF transceivers. The present technology can then use RF transmissions received from a plurality of roving RF transmitters in a cooperative method to gain information about the roving RF transmitters. In one embodiment, this is accomplished over a data network where systems level time is known across the data network.

In one embodiment, control station 605 employs a control program that manages communications within the RF transceiver system. In one embodiment, the RF transceivers in the RF transceiver system communicate with each other to determine a common time base. In one embodiment, the control program can identify a common symbol received from one roving RF device and received by a plurality of RF transceivers.

In one embodiment, the location of the roving RF can be determined each time a common symbol is received or there can be some time delay between successive location computations. The location history of a plurality of roving RF devices may be stored in a location data base. In one embodiment, the control program has access to the roving RF location database. The control program can recognize data created by a plurality of roving RF devices.

In one embodiment, the control program can analyze the accumulation of roving RF devices over time. Such analyzing may lead to determinations regarding areas of common location as areas where a roving RF device can travel and areas where no roving RF device can travel. In one embodiment, the control program can develop a location point cloud defining where roving RF devices can and cannot go.

In one embodiment, the control program can associate the location point cloud with other stored data such as floor plans or other maps. In one embodiment, the control program can recognize a different pattern of the point cloud produced by a plurality of roving RF devices. The control program can then determine that the physical obstructions have changed, such as but not limited to movement of walls or furniture. An alert may be issued regarding the change.

In one embodiment, the control program can analyze other symbols from roving RF devices to build an identity for each roving device. The control program can associate identity of the roving RF device with other identities know within its database. The control program can analyze other symbols from roving RF devices to build a behavioral model for each roving RF device.

In one embodiment, for a defined area covered by the RF transceiver system there is a programmable set of access attributes associated with saved identities. The control program can issue an alert when the identity associated with a roving RF device is in an area for which access has not be granted.

In one embodiment, the control program can associate the identity developed for the roving RF device to a set of saved preferences to alter the environment based on the identity, control environmental aspects such as, but not limited to, lighting, audio, video, temperature, atmosphere. In one embodiment, the control program that can associate the identity of a roving RF device with saved or generated work flows Environmental Conditions In one embodiment, the mobile devices are capable of collecting and exchanging data related to environmental conditions. For example, the mobile device may be able to monitor air quality, temperature, humidity, etc. This data may be exchanged and transmitted to mapping system 115. Mapping system 115 may then make determinations related to environmental conditions. In one embodiment, environmental alerts regarding environmental conditions may be sent to users. Users may request that such alerts be sent automatically or the alerts may be sent upon request. The user may then make decisions based on the alerts. Such alerts may be useful to users who suffer from medical conditions such as asthma and want to avoid places during times when the place is experiencing poor air quality.

In one embodiment, the mobile devices may exchange data related to both geographical positions and environmental data. In one embodiment, the mobile devices may have sensors that detect carbon monoxide and may be able to exchange data collected from the carbon monoxide sensors. In one embodiment, the mobile devices may exchange data related to sensors which detect polyethylene off-gassing. Such data may be used to monitor buildings or outdoor environments. The data may be used to make management decisions or may be employed by emergency responders.

Reality Searches

In one embodiment, the present technology may be employed to perform reality searches. A user may have access to all of the data being exchanged over the described networks, in an embodiment of the present technology. The data may be searched to determine present time conditions. For example, such a search may result in data that was collected from a particular device regarding carbon monoxide levels. The user may then use the reality search to request real time updates from the particular device regarding current carbon monoxide levels. Thus, the user was able to search the real time reality of an environmental condition.

In one embodiment, a reality search may focus on the mapping aspects of the present technology. The map created by the present technology is a representation of a real building or outdoor space. Thus a search of the map is a search of reality. A reality search may be performed at a network computer, a server, or a mobile device. The results of the reality search may be employed to make decisions based on real time data or the most recent data available.

In one embodiment, the present technology may be employed to monitor objects such as trees. For example, a forester may place an RFID device, or other presence absent device, on a tree or sapling. The RFID device may be programmed with data related to the tree's genotype and other data. The RFID device may be updated by the forester periodically with data related to the trees age, size, potential for lumber, etc. This data could then be exchanged with a device within range of the RFID device. The data could then be searched along with data from a plurality of trees located near each other. Thus a reality search related to the trees and saplings may be performed. This example may be taken further by updating the RFID device with data as the tree is processed into lumber and the data is exchanged in a network. This data can then be used to certify or prove that a tree was grown and processed with specific techniques. For example, lumber created from the tree may be certified according to various green standards.

In one embodiment, mapping system 115 may be associated with a construction site and the mobile devices may be associated with tools or equipment associated with the constructions site. Thus mapping system 115 may make inferences regarding the progress of construction at the construction site and may also make inferences regarding missing tools, equipment or personnel at a constructions site.

The present technology may also be employed to track the movement of many difference objects. This tracking may include tracking movements of people, equipment, tools and animals. For example, mobile devices may be attached to animals such as fish. Migratory patterns regarding the movements of fish may then be determined.

Operation

More generally, embodiments described herein are in accordance with the present technology. Such methods can be implemented using a variety of electronic devices including smart phones, mobile devices and computer system. It should be appreciated that the present technology does not require all the steps described below to be carried out for a single embodiment, nor must the steps be performed in a particular order unless specifically described.

FIG. 2 is a flowchart illustrating process 200 for exchanging data, in accordance with one embodiment of the present technology. In one embodiment, process 200 is carried out by processors and electrical components under the control of computer readable and computer executable instructions stored on a computer-usable storage medium. The computer readable and computer executable instructions reside, for example, in data storage features such as non-transitory computer-usable volatile and non-volatile memory. In one embodiment, process 200 is performed by system 100 of FIG. 1. These methods, functions and other steps may be embodied as machine readable instructions stored on one or more computer readable mediums, which may be non-transitory such as hardware storage devices (e.g., RAM (random access memory), ROM (read only memory), EPROM (erasable programmable ROM), EEPROM (electrically erasable programmable ROM), hard drives, and flash memory). In one embodiment, process 200 is carried out by an app on a mobile device.

At 202, a first set of data is generated at a first mobile device wherein the first set of data is related to a plurality of geographic positions where the first mobile device has been located. In one embodiment, the first mobile device is first mobile device 105 of FIG. 1.

At 204, a second set of data is wirelessly received at the first mobile device wherein the second set of data is related to a plurality of geographic positions where the second mobile device has been located. In one embodiment, the second mobile device automatically transmits the data to the first mobile device when the first mobile device is physically proximate to the second mobile device. Such physical proximity could be determined by establishing a distance or a range of distances or could be determined by the ability to network using short range techniques. In one embodiment, the first mobile device and the second mobile device generate and exchange data related to environmental conditions around or near the mobile device.

At 206, the first set of data and the second set of data is wirelessly transmitted from the first mobile device to a mapping system such that the first set of data and the second set of data is used to create a map.

FIG. 3 is a flowchart illustrating process 300 for exchanging data, in accordance with one embodiment of the present technology. In one embodiment, process 300 is carried out by processors and electrical components under the control of computer readable and computer executable instructions stored on a computer-usable storage medium. The computer readable and computer executable instructions reside, for example, in data storage features such as non-transitory computer-usable volatile and non-volatile memory. In one embodiment, process 300 is performed by system 100 of FIG. 1. These methods, functions and other steps may be embodied as machine readable instructions stored on one or more computer readable mediums, which may be non-transitory such as hardware storage devices (e.g., RAM (random access memory), ROM (read only memory), EPROM (erasable programmable ROM), EEPROM (electrically erasable programmable ROM), hard drives, and flash memory).

At 302, a first set of data and a second set of data is received from a first mobile device at a mapping system wherein the first set of data comprises data related to geographical positions of the first mobile device and the second set of data comprises data related to geographical positions of a second mobile device.

At 304, a map is generated at the mapping system based on the first set of data and the second set of data. In one embodiment, the map is an interior map of a building.

At 306, movements of people are inferred based on the first set of data and the second set of data. In one embodiment, the movement of other objects may be inferred including animals, equipments, vehicles, tools, etc.

At 308, characteristics of a building are inferred based on a measurement of a signal strength of the receiving the first set of data and the second set of data from the first mobile device.

Figure 8:
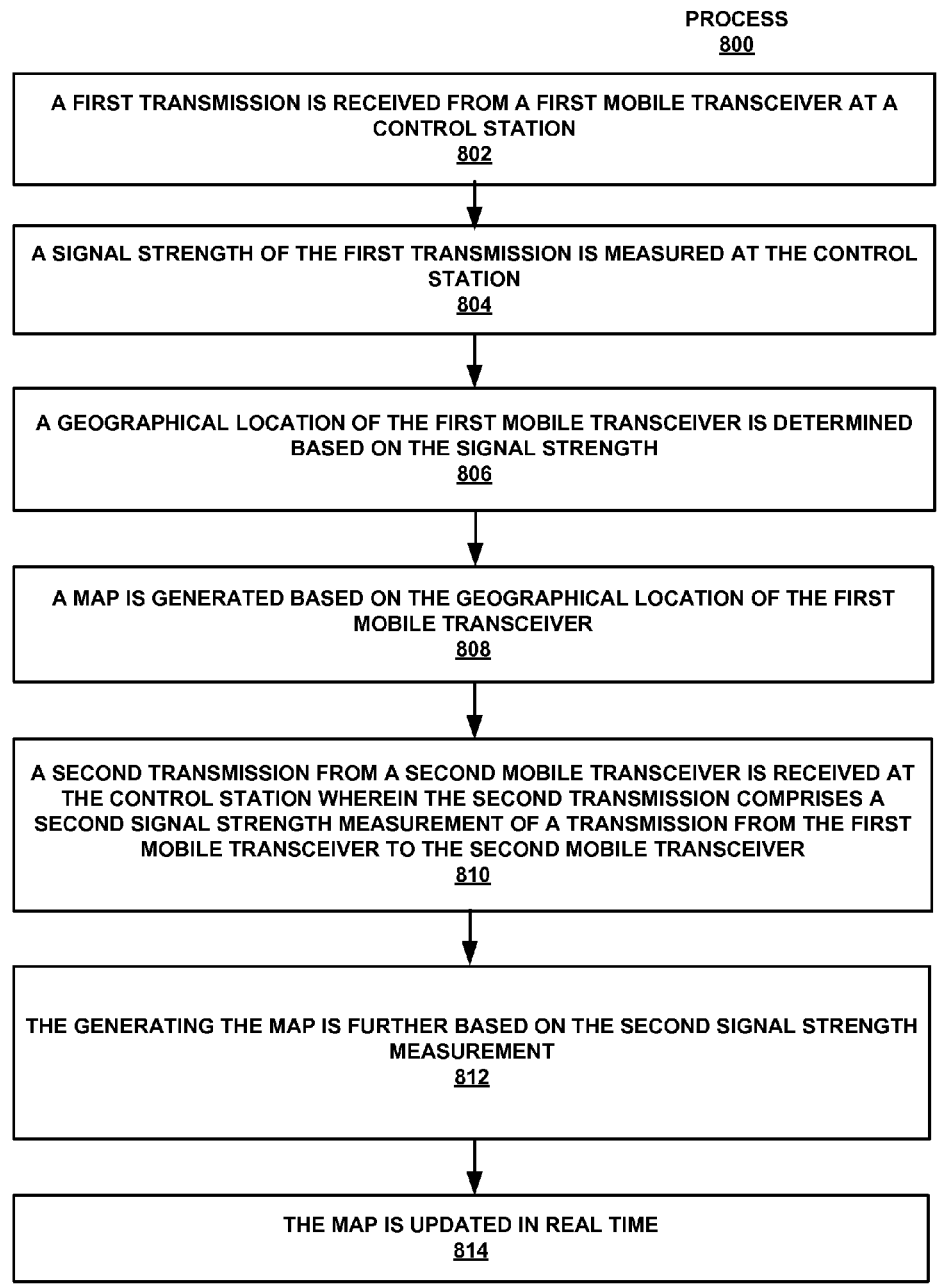
FIG. 8 is a flowchart of a method for exchanging data, according to another embodiment of the present technology.

FIG. 8 is a flowchart illustrating process 800 for exchanging data, in accordance with one embodiment of the present technology. In one embodiment, process 800 is carried out by processors and electrical components under the control of computer readable and computer executable instructions stored on a computer-usable storage medium. The computer readable and computer executable instructions reside, for example, in data storage features such as non-transitory computer-usable volatile and non-volatile memory. In one embodiment, process 800 is performed by environment 600 of FIG. 6. These methods, functions and other steps may be embodied as machine readable instructions stored on one or more computer readable mediums, which may be non-transitory such as hardware storage devices (e.g., RAM (random access memory), ROM (read only memory), EPROM (erasable programmable ROM), EEPROM (electrically erasable programmable ROM), hard drives, and flash memory).

At 802, a first transmission is received from a first mobile transceiver at a control station. In one embodiment, this step may be carried with the devices and techniques described in FIG. 6. In one embodiment, the first mobile transceiver is a handheld electronic device that is carried by a person.

At 804, a signal strength of the first transmission is measured at the control station. In one embodiment, the signal is a radio signal that passes through objects.

At 806, a geographical location of the first mobile transceiver is determined based on the signal strength. For example, the control station may employ data from other transceivers regarding the signal strength of the first transmissions. Taken together the signal strength data can be used to compute a location. In one embodiment, the control station has data regarding the first mobile transceiver's initial position that may be combined with the signal strength data determine the location.

At 808, a map is generated based on the geographical location of the first mobile transceiver. In one embodiment, the map is created as described for map 700 of FIG. 7.

At 810, a second transmission from a second mobile transceiver is received at the control station wherein the second transmission comprises a second signal strength measurement of a transmission from the first mobile transceiver to the second mobile transceiver.

At 812, the generating the map is further based on the second signal strength measurement.

At 814, the map is updated in real time.

Figure 9:
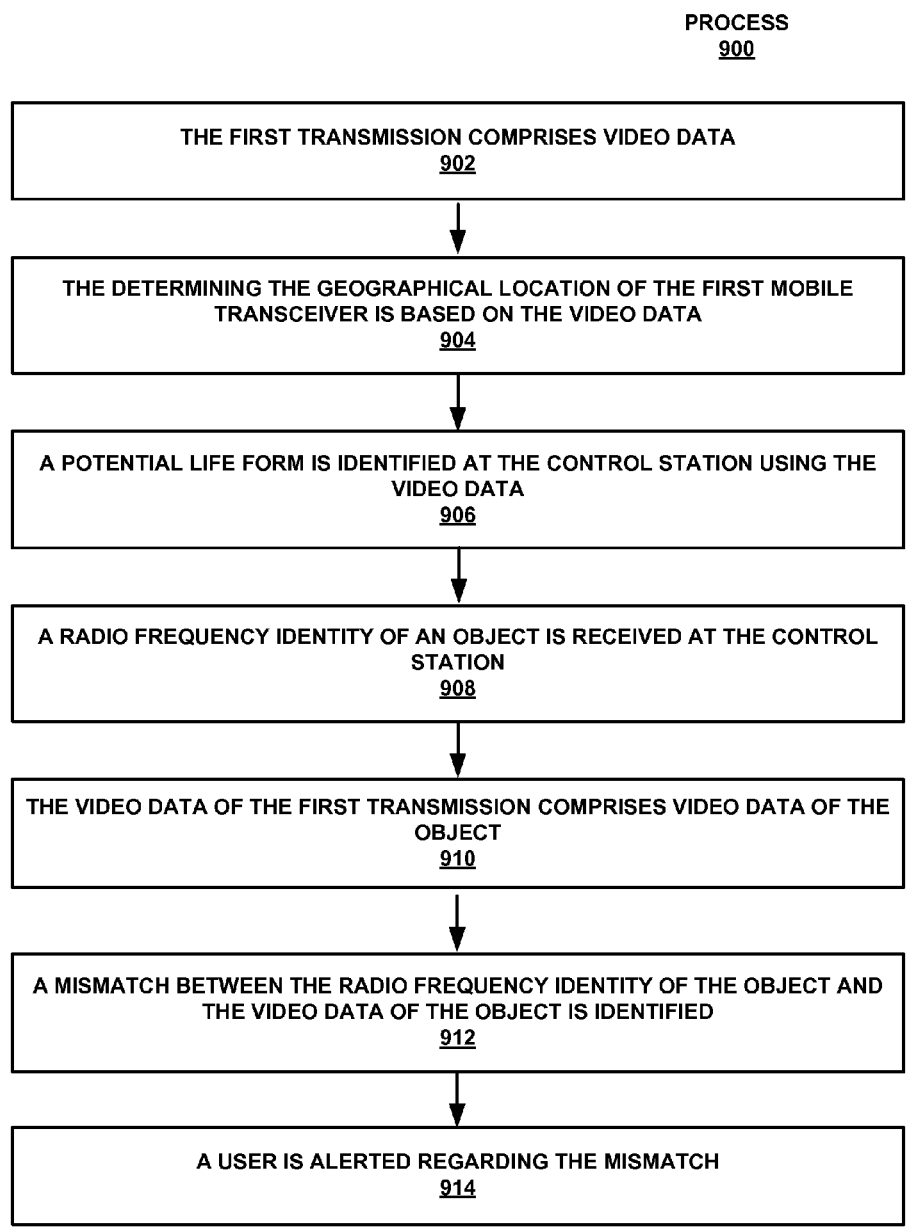
FIG. 9 is a flowchart of a method for exchanging data, according to another embodiment of the present technology.

FIG. 9 is a flowchart illustrating process 900 for exchanging data, in accordance with one embodiment of the present technology. In one embodiment, process 900 is carried out by processors and electrical components under the control of computer readable and computer executable instructions stored on a computer-usable storage medium. The computer readable and computer executable instructions reside, for example, in data storage features such as non-transitory computer-usable volatile and non-volatile memory. In one embodiment, process 900 is performed by environment 600 of FIG. 6. These methods, functions and other steps may be embodied as machine readable instructions stored on one or more computer readable mediums, which may be non-transitory such as hardware storage devices (e.g., RAM (random access memory), ROM (read only memory), EPROM (erasable programmable ROM), EEPROM (electrically erasable programmable ROM), hard drives, and flash memory).

At 902, the first transmission comprises video data. In one embodiment, the video data is digital and uses well known protocols and standards. In one embodiment, the video data was captured using a video camera coupled with or acting as a component of the first mobile transceiver.

At 904, the determining the geographical location of the first mobile transceiver is based on the video data. In one embodiment, this is accomplished using well know techniques for identifying a geographical location based on an image or a video stream.

At 906, potential life form is identified at the control station using the video data. In one embodiment, this is accomplished using well known techniques for recognizing shapes and features associated with life forms.

At 908, a radio frequency identity of an object is received at the control station. In one embodiment, each transceiver or control station has a unique property associated with its transmissions. In one embodiment, the object has an RFID tag that broadcasts its identity.

At 910, the video data of the first transmission comprises video data of the object. Such video may be captured using a video capture device associated with the mobile transceiver.

At 912, a mismatch between the radio frequency identity of the object and the video data of the object is identified.

At 914, a user is alerted regarding the mismatch.

Figure 10:
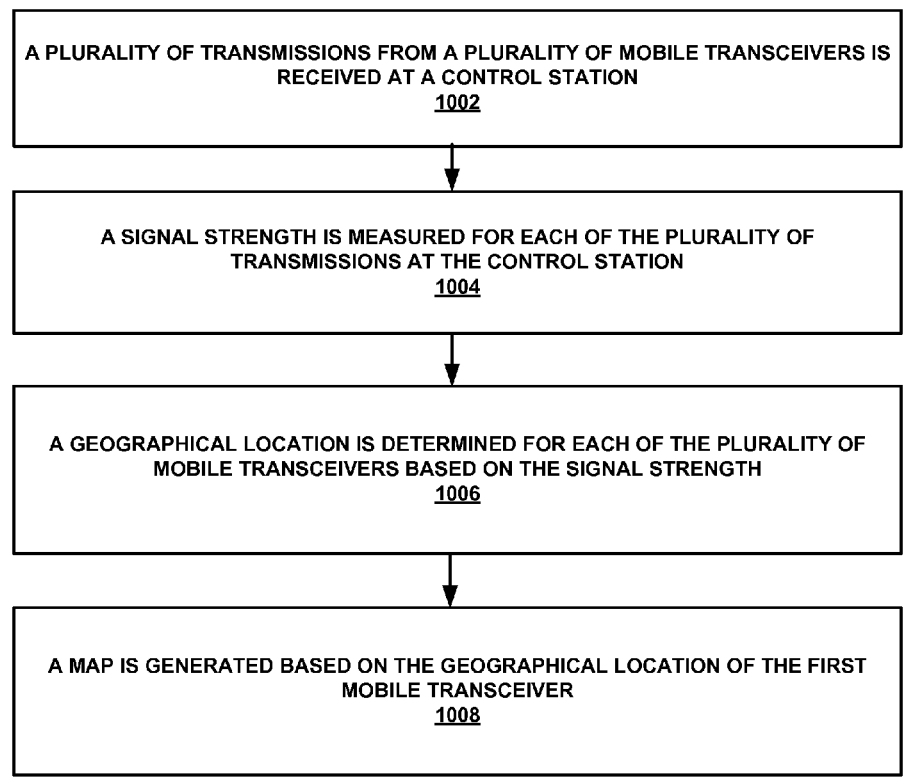
FIG. 10 is a flowchart of a method for exchanging data, according to another embodiment of the present technology.

FIG. 10 is a flowchart illustrating process 1000 for exchanging data, in accordance with one embodiment of the present technology. In one embodiment, process 1000 is carried out by processors and electrical components under the control of computer readable and computer executable instructions stored on a computer-usable storage medium. The computer readable and computer executable instructions reside, for example, in data storage features such as non-transitory computer-usable volatile and non-volatile memory. In one embodiment, process 1000 is performed by environment 600 of FIG. 6. These methods, functions and other steps may be embodied as machine readable instructions stored on one or more computer readable mediums, which may be non-transitory such as hardware storage devices (e.g., RAM (random access memory), ROM (read only memory), EPROM (erasable programmable ROM), EEPROM (electrically erasable programmable ROM), hard drives, and flash memory).

At 1002, a plurality of transmissions from a plurality of mobile transceivers is received at a control station. For example, the plurality of mobile transceivers may be several smart phones connected to the control station on a network. The network may be a Wi-Fi network.

At 1004, a signal strength is measured for each of the plurality of transmissions at the control station.

At 1006, a geographical location is determined for each of the plurality of mobile transceivers based on the signal strength. By using a plurality of signal strength measurements, the more accurate the determination of the geographical locations become.

At 1008, a map is generated based on the geographical location of the first mobile transceiver. In one embodiment, the map is created as described for map 700 of FIG. 7.

Mobile Application

In one embodiment, the present technology may be carried out, in part, on a mobile device via a software application. The software application may be known as an app or a mobile app. The app may be installed on a variety of mobile devices including smart phones such as an iPhone, a Blackberry, a mobile device running the Android operating system, etc.

In one embodiment, steps 202, 204 and 206 of FIG. 2 may be carried out at a mobile device executing the described app. For example, the app collects position related data and/or environmental data and relays such data to other mobile devices or routers. In one embodiment, a mobile device or smart phone may be issued to employees by a corporation or other entity. The corporation may require that mobile devices issued to employees run the described app. Thus the corporation may ensure that the benefits of the present technology are had by the corporation. For example, the mobile devices may be used by employees inside of a building owned and operated by the corporations. Thus the corporation will ensure that an indoor map of the building may be created via the mobile devices owned by the corporation. In one embodiment, the app may collect data using the hardware incorporated in the mobile device in an anonymous manner such that information regarding the user of the device is not associated with the data collected by the app. This ensures the privacy and anonymity of the user. In one embodiment, the mobile application is installed voluntarily on the mobile device by the owner of the mobile device.

The present technology demonstrates a crowd sourcing solution to the problem of creating an indoor map. In one embodiment, the indoor map of a building created by the present technology is provided to first responders. Thus the owners of a building may have an interest in ensuring that the present technology in used in their buildings such that emergency responders may be provided with an accurate map of the building in an emergency situation.

Figure 5:
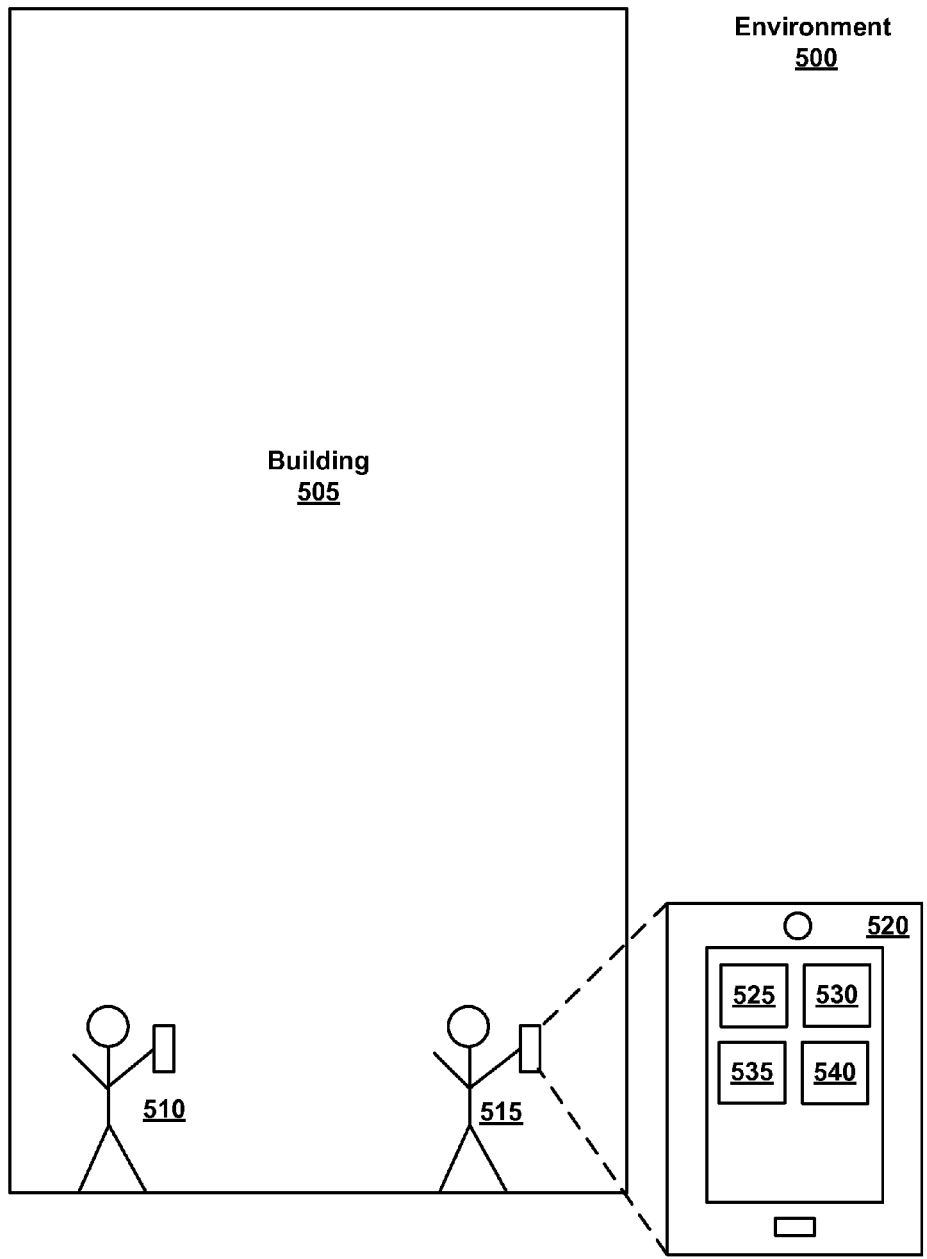
FIG. 5 is a block diagram of an environment for exchanging data, according to one embodiment of the present technology.

FIG. 5 is a block diagram of an exemplary environment 500 for exchanging data, according to embodiments of the present technology. It is noted that the blocks in FIG. 5 can be arranged differently than illustrated, and can implement additional or fewer features than what are described herein. Further, the features represented by the blocks in FIG. 5 can be combined in various ways.

In one embodiment, FIG. 5 shows building 505 which may be a building with multiple floors, rooms, doors, windows, hallways, etc. FIG. 5 also depicts user 510 holding a mobile device and user 515 holding a mobile device. In one embodiment, the mobile devices of user 510 and user 515 may be used to perform embodiments of the present technology as described above. The mobile device of user 515 is shown in an enlarged view as depicted by device 520. In one embodiment, device 520 employs a graphical user interface that displays apps to user 515. Device 520 is depicted displaying app 525, 530, 535 and 540. The present technology may be represented by app 525 such that a user may select the region of the graphical display representing app 525 and then device 520 would display information and options related to the present technology. In one embodiment, the app related to the present technology would be inaccessible by user 515 and would only be accessible by the administrator of device 520. Such an embodiment may be used in a situation where user 515 is required to run the app on device 520.

Combinations

It should be appreciated that the practices of the present technologies described herein may be combined with one another. In one embodiment, a system may create a map using techniques involving position centric devices exchanging location data as wells as techniques involving the measuring of signal strength of transmissions of a transceivers. In one embodiment, the present technology may use both techniques with the same set of devices. For example, a position centric device may also be a mobile transceiver and is used for more than one technique described here.

Thus a map may be created using both the exchange of geographic position data between devices as well as the measurement of signal strength data. Other aspects of the present technology may be combined such as signal strength measuring, geographic position data exchanging, reality searching, map generating, environmental conditions, mobile applications, video data exchanging, etc. For example, a system may employ signal strength measuring combined with the exchange of environmental sensor data to perform a reality search.

Constructions Sites

The present technology may also be employed during the construction of a building or other structure. In one embodiment, a map is generated of a partially constructed building or other structure using mapping system 115 of FIG. 1 and other components of FIG. 1 as described herein. In one embodiment, the map generated is map 700 of FIG. 7. In one embodiment, the map generated of the building is not a complete map, but is a map of the building partially completed showing the as-built state of the building at a given time. For example, mapping system 115 may generate a map of a floor of a building with only two rooms on day 20 of the construction. On day 30 an updated map may depict three rooms. Between day 20 and day 30 of the construction, progress was made on the building and the map was updated. The present technology is well suited to quickly make maps of partially constructed buildings and other structures and to make the maps available electronically.

In one embodiment, mobile devices are employed to generate a map of a partially constructed building such as first mobile device 105 and second mobile device 110 of FIG. 1. In one embodiment, a corporation or other entity may oversee the construction of a building and may employ employees to carry out such construction. The employees may be issued mobile devices by the corporation or other entities. In one embodiment, such a corporation may require the mobile devices issued to employees be utilized to generate and exchange data as described for the present technology to generate a map of the partially constructed building. Such information may be exchanged anonymously and not tied to the identity of the employee.

Figure 11:
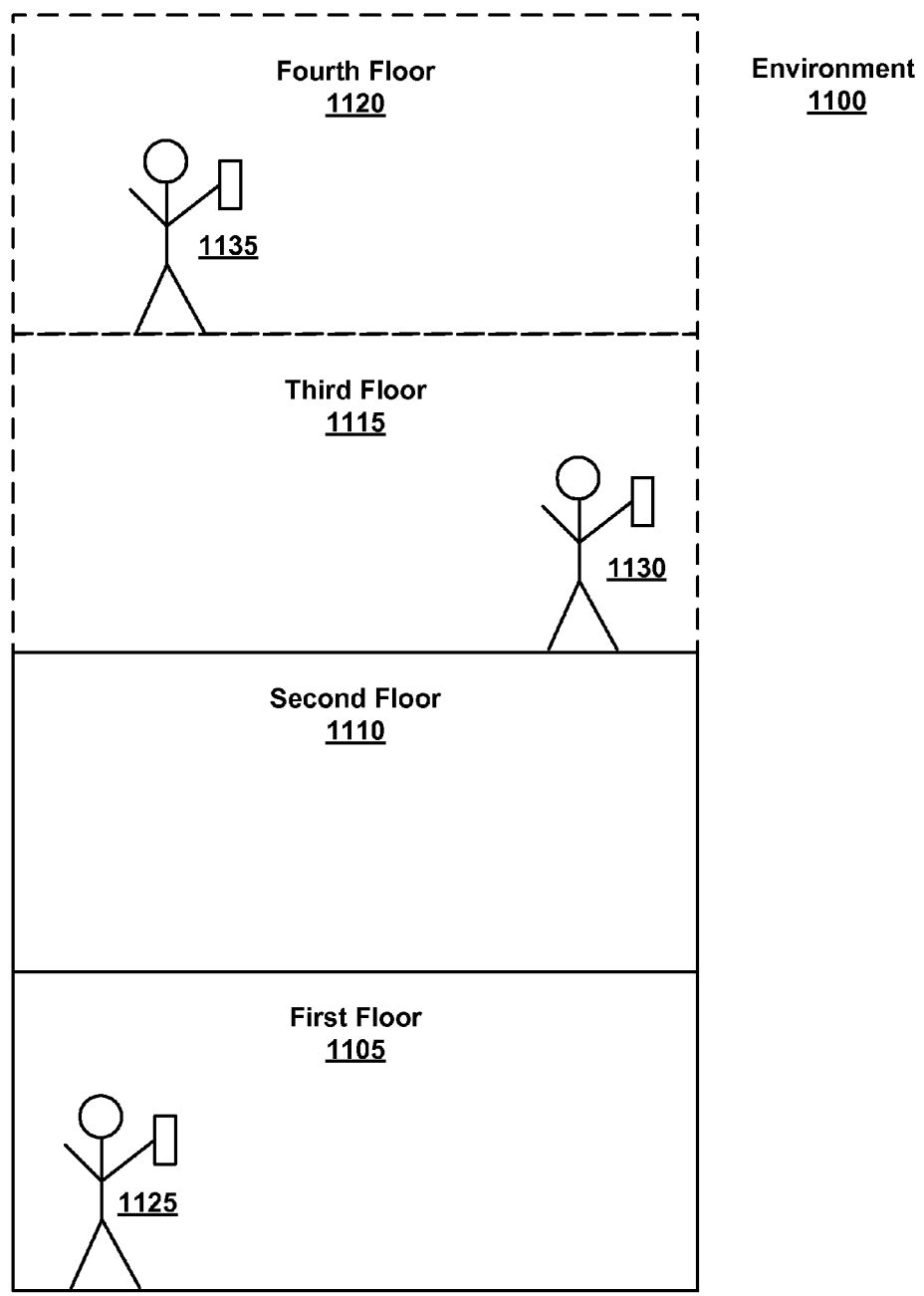
FIG. 11 is a block diagram of an environment for exchanging data, according to one embodiment of the present technology.

FIG. 11 is a block diagram of an exemplary environment 1100 for exchanging data, according to embodiments of the present technology. It is noted that the blocks in FIG. 11 can be arranged differently than as illustrated, and can implement additional or fewer features than what are described herein. Further, the features represented by the blocks in FIG. 11 can be combined in various ways.

FIG. 11 depicts a front elevation view of a building under construction. The building comprises first floor 1105, second floor 1110, third floor 1115, and fourth floor 1120. In one embodiment, third floor 1115 and fourth flour 1120 are shown in dotted lines representing that the floors are still under construction and are only partially complete. Users 1125, 1130 and 1120 may be personnel carrying mobile devices that operate in accordance with the present technology. For example, the users may be carrying smart phones that exchange position centric data with one another and relay that data to a central system such as mapping system 115 of FIG. 1. The data exchanged is then used to generate a map of the partially constructed building for a given time.

In one embodiment, maps could be automatically generated periodically showing the current state of the construction progress at the time the map is generated. Thus the present technology also serves to document a timeline regarding the constructions of the building. In one embodiment, the map of the partially constructed building is generated upon request of a user.

Figure 12:
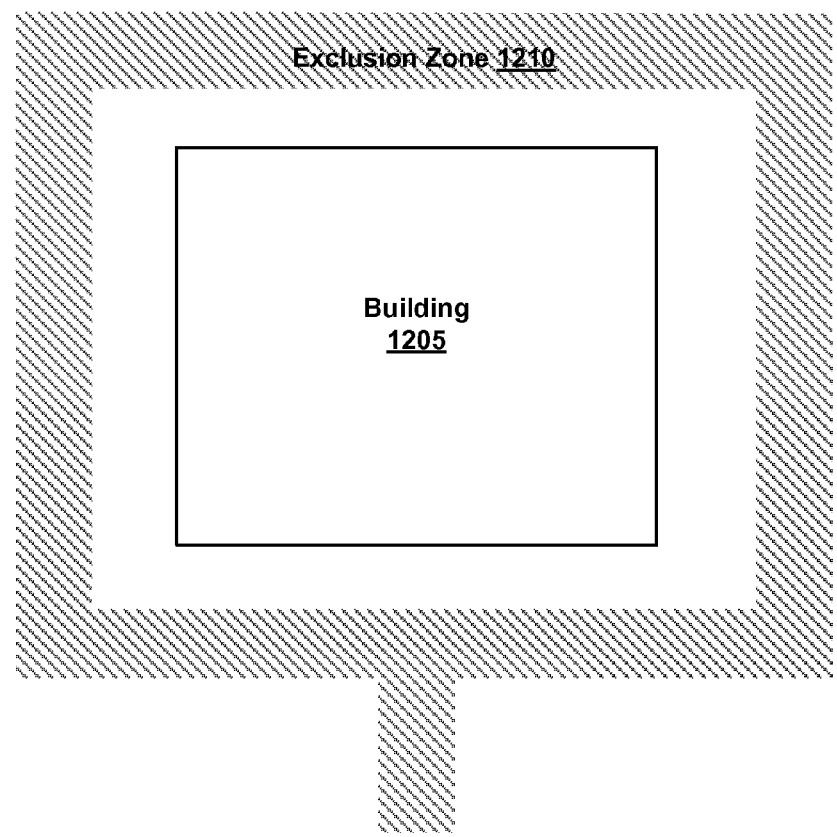
FIG. 12 is a block diagram of an environment for exchanging data, according to one embodiment of the present technology.

FIG. 12 is a block diagram of an exemplary environment 1200 for exchanging data, according to embodiments of the present technology. It is noted that the blocks in FIG. 12 can be arranged differently than as illustrated, and can implement additional or fewer features than what are described herein. Further, the features represented by the blocks in FIG. 12 can be combined in various ways.

FIG. 12 depicts a top view of building and exclusion zone 1210. In one embodiment, exclusion zone 1210 is region associated with a construction site that is designated as an area where it is not safe for personnel to be located. For example, exclusion zone 1210 may be an area or region around a building under construction where a crane is operating and it is unsafe to stand in exclusion zone 1210 as debris may fall during the operation of the crane. Exclusion zone 1210 may be several varieties of shapes and may change over time during the construction of the building. Exclusion zone 1210 may be designated as an exclusion zone based on crane operation, large truck operation, machine movements, equipment operation, deliveries, etc. In one sense, exclusion zone 1210 may be thought of as any area where it is undesirable for persons to be located during a given time period.

The present technology may be employed to generate alerts regarding exclusion zones and send the alerts to employees or others associated with the constructions site. In one embodiment, the alerts may be generated automatically and may be sent electronically. The alerts may be sent using well known techniques such as automated voice messages to phones, text messages, emails, etc. The alerts may also be printed out on a medium or displayed on screens associated with construction or job sites. In one embodiment, the alerts regarding the exclusion zones are sent out on a schedule prior to when the exclusion zone should be avoided. In one embodiment, the alerts are sent to employees of a construction company who are associated with the construction of the building.

In one embodiment, the alerts regarding the exclusion zones are generated by by mapping system 115 of FIG. 1. In one embodiment, mapping system 115 receives data regarding the exclusion zones and generates the alerts automatically or upon request. A protocol may be established which governs who is to receive the alerts, how the alerts are to be delivered and when the alerts are sent. In one embodiment, the same alert is repeated periodically. In one embodiment, mapping system 115 infers where and when an exclusion zone is to occur based on inferences made using data received by mapping system 115.

Aspects of the present technology regarding constructions sites, including maps of partially constructed building and alerts regarding exclusions zones, may be combined with any other aspect of the present technology such as environments conditions, mobile apps, reality searches, etc.

Figure 13:
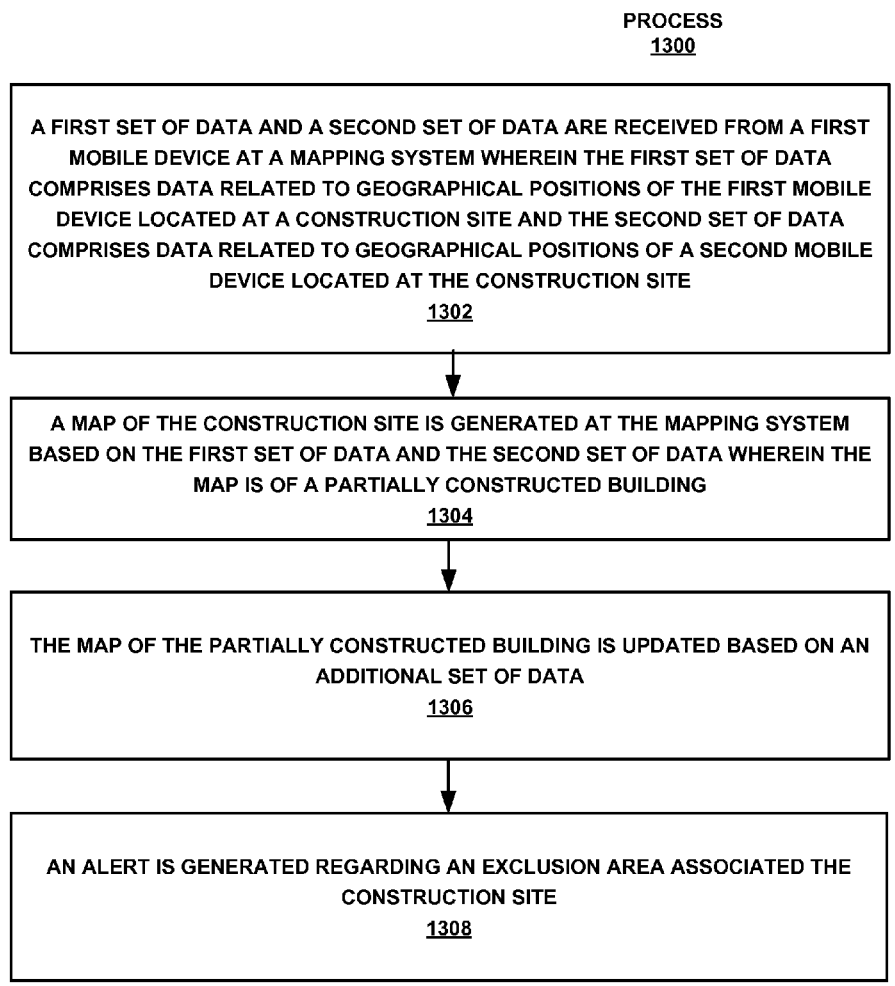
FIG. 13 is a flowchart of a method for exchanging data, according to another embodiment of the present technology.

FIG. 13 is a flowchart illustrating process 1300 for exchanging data, in accordance with one embodiment of the present technology. In one embodiment, process 1300 is carried out by processors and electrical components under the control of computer readable and computer executable instructions stored on a computer-usable storage medium. The computer readable and computer executable instructions reside, for example, in data storage features such as non-transitory computer-usable volatile and non-volatile memory. In one embodiment, process 1300 is performed by system 100 of FIG. 1. These methods, functions and other steps may be embodied as machine readable instructions stored on one or more computer readable mediums, which may be non-transitory such as hardware storage devices (e.g., RAM (random access memory), ROM (read only memory), EPROM (erasable programmable ROM), EEPROM (electrically erasable programmable ROM), hard drives, and flash memory). In one embodiment, process 1300 is carried out by an app on a mobile device.

At 1302, a first set of data and a second set of data are received from a first mobile device at a mapping system wherein the first set of data comprises data related to geographical positions of the first mobile device located at a construction site and the second set of data comprises data related to geographical positions of a second mobile device located at the construction site.

At 1304, a map of the construction site is generated at the mapping system based on the first set of data and the second set of data wherein the map is of a partially constructed building.

At 1306, the map of the partially constructed building is updated based on an additional set of data. At 1308, an alert is generated regarding an exclusion area associated the construction site.

Example Computer System Environment

With reference now to FIG. 4, portions of the technology for providing a communication composed of non-transitory computer-readable and computer-executable instructions that reside, for example, in non-transitory computer-usable storage media of a computer system. That is, FIG. 4 illustrates one example of a type of computer that can be used to implement embodiments of the present technology. FIG. 4 represents a system or components that may be use in conjunction with aspects of the present technology. In one embodiment, some or all of the components of FIG. 1 or FIG. 3 may be combined with some or all of the components of FIG. 4 to practice the present technology.

FIG. 4 illustrates an example computer system 400 used in accordance with embodiments of the present technology. It is appreciated that system 400 of FIG. 4 is an example only and that the present technology can operate on or within a number of different computer systems including general purpose networked computer systems, embedded computer systems, routers, switches, server devices, user devices, various intermediate devices/artifacts, stand alone computer systems, mobile phones, personal data assistants, televisions and the like. As shown in FIG. 4, computer system 400 of FIG. 4 is well adapted to having peripheral computer readable media 402 such as, for example, a floppy disk, a compact disc, and the like coupled thereto.

System 400 of FIG. 4 includes an address/data bus 404 for communicating information, and a processor 406A coupled to bus 404 for processing information and instructions. As depicted in FIG. 4, system 400 is also well suited to a multi-processor environment in which a plurality of processors 406A, 406B, and 406C are present. Conversely, system 400 is also well suited to having a single processor such as, for example, processor 406A. Processors 406A, 406B, and 406C may be any of various types of microprocessors. System 400 also includes data storage features such as a computer usable volatile memory 408, e.g. random access memory (RAM), coupled to bus 404 for storing information and instructions for processors 406A, 406B, and 406C.

System 400 also includes computer usable non-volatile memory 410, e.g. read only memory (ROM), coupled to bus 404 for storing static information and instructions for processors 406A, 406B, and 406C. Also present in system 400 is a data storage unit 412 (e.g., a magnetic or optical disk and disk drive) coupled to bus 404 for storing information and instructions. System 400 also includes an optional alpha-numeric input device 414 including alphanumeric and function keys coupled to bus 404 for communicating information and command selections to processor 406A or processors 406A, 406B, and 406C. System 400 also includes an optional cursor control device 416 coupled to bus 404 for communicating user input information and command selections to processor 406A or processors 406A, 406B, and 406C. System 400 of the present embodiment also includes an optional display device 418 coupled to bus 404 for displaying information.

Referring still to FIG. 4, optional display device 418 of FIG. 4 may be a liquid crystal device, cathode ray tube, plasma display device or other display device suitable for creating graphic images and alpha-numeric characters recognizable to a user. Optional cursor control device 416 allows the computer user to dynamically signal the movement of a visible symbol (cursor) on a display screen of display device 418. Many implementations of cursor control device 416 are known in the art including a trackball, mouse, touch pad, joystick or special keys on alpha-numeric input device 414 capable of signaling movement of a given direction or manner of displacement. Alternatively, it will be appreciated that a cursor can be directed and/or activated via input from alpha-numeric input device 414 using special keys and key sequence commands.

System 400 is also well suited to having a cursor directed by other means such as, for example, voice commands. System 400 also includes an I/O device 420 for coupling system 400 with external entities. For example, in one embodiment, I/O device 420 is a modem for enabling wired or wireless communications between system 400 and an external network such as, but not limited to, the Internet. A more detailed discussion of the present technology is found below.

Referring still to FIG. 4, various other components are depicted for system 400. Specifically, when present, an operating system 422, applications 424, modules 426, and data 428 are shown as typically residing in one or some combination of computer usable volatile memory 408, e.g. random access memory (RAM), and data storage unit 412. However, it is appreciated that in some embodiments, operating system 422 may be stored in other locations such as on a network or on a flash drive; and that further, operating system 422 may be accessed from a remote location via, for example, a coupling to the internet. In one embodiment, the present technology, for example, is stored as an application 424 or module 426 in memory locations within RAM 408 and memory areas within data storage unit 412. The present technology may be applied to one or more elements of described system 400. For example, a method of modifying user interface 225A of device 115A may be applied to operating system 422, applications 424, modules 426, and/or data 428.

System 400 also includes one or more signal generating and receiving device(s) 430 coupled with bus 404 for enabling system 400 to interface with other electronic devices and computer systems. Signal generating and receiving device(s) 430 of the present embodiment may include wired serial adaptors, modems, and network adaptors, wireless modems, and wireless network adaptors, and other such communication technology. The signal generating and receiving device(s) 430 may work in conjunction with one or more communication interface(s) 432 for coupling information to and/or from system 400. Communication interface 432 may include a serial port, parallel port, Universal Serial Bus (USB), Ethernet port, antenna, or other input/output interface. Communication interface 432 may physically, electrically, optically, or wirelessly (e.g. via radio frequency) couple system 400 with another device, such as a cellular telephone, radio, or computer system.

The computing system 400 is only one example of a suitable computing environment and is not intended to suggest any limitation as to the scope of use or functionality of the present technology. Neither should the computing environment 400 be interpreted as having any dependency or requirement relating to any one or combination of components illustrated in the example computing system 400.

The present technology may be described in the general context of computer-executable instructions, such as program modules, being executed by a computer. Generally, program modules include routines, programs, objects, components, data structures, etc., that perform particular tasks or implement particular abstract data types. The present technology may also be practiced in distributed computing environments where tasks are performed by remote processing devices that are linked through a communications network. In a distributed computing environment, program modules may be located in both local and remote computer-storage media including memory-storage devices.

Although the subject matter is described in a language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A system for exchanging data:
   a first mobile device configured to generate a first set of data related to a plurality of geographic positions where said first mobile device has been located and configured to exchange said first set of data with a second mobile device wherein said first mobile device receives a second set of data related to a plurality of geographic positions where said second mobile device has been located; and
   a mapping system configured to receive said first set of data and said second set of data from said first mobile device and to generate a map of space and objects around said first mobile device and said second mobile device based on said first set of data and said second set of data.

2. The system of claim 1, further comprising:
   a first wireless router coupled with said first mobile device for forwarding said first set of data to said mapping system.

3. The system of claim 1, wherein said mapping system is a wireless router fixed in a geographical position coupled with a memory and a process.

4. The system of claim 1 wherein said first mobile device automatically exchanges data with said second mobile device when said first mobile device is physically proximate to said second mobile device.

5. The system of claim 1 wherein said first mobile device forms a temporary pico-net with said second mobile device.

6. The system of claim 1 wherein said first mobile device forms a temporary macro-net with said second mobile device and a plurality of other devices.

7. The system of claim 1 wherein said first mobile device forms a temporary personal area network with said second mobile device.

8. The system of claim 1 wherein said map is of an outdoor area.

9. The system of claim 1 wherein said map is an interior map of a building.

10. The system of claim 1 wherein said mapping system communicates with a plurality of mobile devices.

11. The system of claim 10 wherein said mapping system makes inferences of characteristics of an interior of a building based on a measurement of signal strength of said plurality of mobile devices.

12. The system of claim 1 wherein said mapping system makes inferences about movements of people in an interior of a building based on said first set of data and said second set of data.

13. The system of claim 1 wherein said first mobile device is further configured to generate environmental data related to environmental conditions and exchange said environmental data with said second mobile device and said mapping system.

14. The system of claim 13 wherein said first mobile device makes geographical position data and environmental data available to a user to perform reality searches.

15. The system of claim 1 wherein said first mobile device employs a radio frequency identity for exchanging data.

16. The system of claim 1 wherein said first mobile device employs a wireless communication protocol for exchanging data.

17. A method for exchanging data:
generating a first set of data at a first mobile device wherein said first set of data is related to a plurality of geographic positions where said first mobile device has been located;
wirelessly receiving a second set of data at said first mobile device wherein said second set of data is related to a plurality of geographic positions where said second mobile device has been located; and
wirelessly transmitting said first set of data and said second set of data from said first mobile device to a mapping system such that said first set of data and said second set of data is used to create a map of space and objects around said first mobile device and said second mobile device.

18. The method of claim 17 wherein said receiving said second set of data occurs automatically when said first mobile device is in physical proximity to said second mobile device.

19. The method of claim 17 wherein said transmitting said first set of data and said second set of data occurs automatically when said first mobile device is in range of said mapping system.

20. The method of claim 17 wherein said generating said first set of data comprises environment data related to environmental conditions.

21. The method of claim 20 further comprising:
making geographical position data and environmental data available to a user to perform reality searches.

22. A method for exchanging data:
receiving a first set of data and a second set of data from a first mobile device at a mapping system wherein said first set of data comprises data related to geographical positions of said first mobile device and said second set of data comprises data related to geographical positions of a second mobile device; and
generating a map of space and objects around said first mobile device and said second mobile device at said mapping system based on said first set of data and said second set of data.

23. The method of claim 22, further comprising:
inferring movements of people based on said first set of data and said second set of data.

24. The method of claim 22, further comprising:
inferring characteristics of a building based on a measurement of a signal strength of said receiving said first set of data and said second set of data from said first mobile device.

25. The method of claim 22 wherein said generating said map further comprises generating an interior map of a building.

26. A computer-usable storage medium having instructions embodied therein that when executed cause a computer system to perform a method for exchanging data, said method comprising:
generating a first set of data at a first mobile device wherein said first set of data is related to a plurality of geographic positions where said first mobile device has been located;
wirelessly receiving a second set of data at said first mobile device wherein said second set of data is related to a plurality of geographic positions where said second mobile device has been located; and
wirelessly transmitting said first set of data and said second set of data from said first mobile device to a mapping system such that said first set of data and said second set of data is used to create a map of space and objects around said first mobile device and said second mobile device.

27. The computer-usable storage medium of claim 26 wherein said receiving said second set of data occurs automatically when said first mobile device is in physical proximity to said second mobile device.

28. The computer-usable storage medium of claim 26 wherein said transmitting said first set of data and said second set of data occurs automatically when said first mobile device is in range of said mapping system.

29. The computer-usable storage medium of claim 26 wherein said generating said first set of data comprises environment data related to environmental conditions.

30. The computer-usable storage medium of claim 29 further comprising:
making geographical position data and environmental data available to a user to perform reality searches.

31. A non-transitory computer-readable storage medium having instructions embodied therein that when executed cause a computer system to perform a method for exchanging data, said method comprising:
receiving a first set of data and a second set of data from a first mobile device at a mapping system wherein said first set of data comprises data related to geographical positions of said first mobile device and said second set of data comprises data related to geographical positions of a second mobile device; and generating a map of space and objects around said first mobile device and said second mobile device at said mapping system based on said first set of data and said second set of data.

32. The non-transitory computer-readable storage medium of claim 31, further comprising:
inferring movements of people based on said first set of data and said second set of data.

33. The non-transitory computer-readable storage medium of claim 31, further comprising:
inferring characteristics of a building based on a measurement of a signal strength of said receiving said first set of data and said second set of data from said first mobile device.

34. The non-transitory computer-readable storage medium of claim 31 wherein said generating said map further comprises generating an interior map of a building.

35. A method for exchanging data:
receiving a first transmission from a first mobile transceiver at a control station;
measuring a signal strength of said first transmission at said control station;
determining a geographical location of said first mobile transceiver based on said signal strength; and
generating a map of space and objects around said first mobile transceiver based on said geographical location of said first mobile transceiver.

36. The method of claim 35 further comprising:
receiving a second transmission from a second mobile transceiver at said control station wherein said second transmission comprises a second signal strength measurement of a transmission from said first mobile transceiver to said second mobile transceiver; and
wherein said generating said map is further based on said second signal strength measurement.

37. The method of claim 36 wherein said first mobile transceiver, said second mobile transceiver and said control station form a data network.

38. The method of claim 35 wherein control station establishes a common time base with said first mobile transceiver.

39. The method of claim 35 wherein said first transmission is time stamped.

40. The method of claim 35 wherein said generating said map is further based on inferences regarding a plurality of geographical locations where said first mobile transceiver has been located and where said first mobile transceiver has not been located.

41. The method of claim 35 wherein said first transmission is transmitted using a radio frequency.

42. The method of claim 35 wherein said first transmission is transmitted using a protocol selected from the list of protocols consisting of: Wi-Fi™, Bluetooth™ and Zigbee™.

43. The method of claim 35 further comprising:
updating said map in real time.

44. The method of claim 35 further comprising:
wherein said first transmission comprises video data; and
wherein said determining said geographical location of said first mobile transceiver is based on said video data.

45. The method of claim 44 further comprising:
identifying a potential life form at said control station using said video data.

46. The method of claim 44 further comprising:
receiving a radio frequency identity of an object at said control station;
wherein said video data of said first transmission comprises video data of said object; and
identifying a mismatch between said radio frequency identity of said object and said video data of said object.

47. The method of claim 46 further comprising:
alerting a user regarding said mismatch.

48. A method for exchanging data:
receiving a plurality of transmissions from a plurality of mobile transceivers at a control station;
measuring a signal strength for each of said plurality of transmissions at said control station;
determining a geographical location of each of said plurality of mobile transceivers based on said signal strength; and
generating a map of space and objects around said plurality of mobile transceivers based on said geographical location of said first mobile transceiver.

49. A system for exchanging data:
a control station configured to receive a plurality of transmissions from a plurality of mobile transceivers, to determine a geographic location of a first mobile transceiver based on a signal strength of a first transmission from said first mobile transceiver and generate a map of space and objects around said plurality of mobile transceivers based on inferences made regarding the geographic location of said first mobile receiver.

50. The system of claim 49 wherein said plurality of transmissions from said plurality of mobile transceivers have data regarding a plurality of signal strengths received at each of said plurality of mobile devices regarding said first transmission of said first mobile receiver and further configured to determine a path of geographic locations of said first mobile transceiver.

51. The system of claim 49 further comprising:
said first mobile transceiver configured to form a data network with said control station and said plurality of mobile transceivers and wherein said first mobile transceiver is configured to receive a second transmission from a second mobile transceiver and generate signal strength data related to said second transmission and transmit said signal strength data to said control station.

52. A method for exchanging data:
receiving a first set of data and a second set of data from a first mobile device at a mapping system wherein said first set of data comprises data related to geographical positions of said first mobile device located at a construction site and said second set of data comprises data related to geographical positions of a second mobile device located at said construction site; and
generating a map of said construction site at said mapping system based on said first set of data and said second set of data wherein said map is of a partially constructed building.

53. The method of claim 52 further comprising:
updating said map of said partially constructed building based on an additional set of data.

54. The method of claim 52 further comprising:
generating an alert regarding an exclusion area associated said construction site.

\* \* \* \* \*